United States Patent
Kotov et al.

(10) Patent No.: US 9,056,951 B2
(45) Date of Patent: Jun. 16, 2015

(54) ULTRASTRONG AND STIFF LAYERED POLYMER NANOCOMPOSITES AND HIERARCHICAL LAMINATE MATERIALS THEREOF

(75) Inventors: Nicholas A. Kotov, Ypsilanti, MI (US); Paul Podsiadlo, Easton, PA (US); Bong Sup Shim, Ann Arbor, MI (US); Ellen M. Arruda, Ann Arbor, MI (US); Anthony Waas, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 1397 days.

(21) Appl. No.: 12/681,298

(22) PCT Filed: Oct. 3, 2008

(86) PCT No.: PCT/US2008/078854
§ 371 (c)(1),
(2), (4) Date: Jun. 24, 2011

(87) PCT Pub. No.: WO2009/085362
PCT Pub. Date: Jul. 9, 2009

(65) Prior Publication Data
US 2011/0250427 A1 Oct. 13, 2011

Related U.S. Application Data

(60) Provisional application No. 60/998,049, filed on Oct. 5, 2007.

(51) Int. Cl.
*B32B 27/00* (2006.01)
*B32B 9/04* (2006.01)
(Continued)

(52) U.S. Cl.
CPC ............... *C08J 5/005* (2013.01); *Y10T 428/25* (2015.01); *B82Y 30/00* (2013.01); *C08K 3/04* (2013.01); *C08K 3/22* (2013.01); *C08K 3/34* (2013.01); *C09D 5/18* (2013.01); *C09D 7/1216* (2013.01)

(58) Field of Classification Search
CPC .................................. C08J 5/005; C08K 3/34
USPC ....................................... 428/300.7, 323, 446
See application file for complete search history.

(56) References Cited

U.S. PATENT DOCUMENTS

| 5,597,631 A * | 1/1997 | Furumoto et al. ........... 428/36.4 |
| 6,881,444 B2 | 4/2005 | Hong et al. |
| 7,223,327 B2 | 5/2007 | Schlenoff et al. |
| 2001/0046564 A1 * | 11/2001 | Kotov ........................ 427/430.1 |

(Continued)

FOREIGN PATENT DOCUMENTS

WO 2009/085362 A2 7/2009

OTHER PUBLICATIONS

Tang, Zhiyong et al., "Nanostructured artificial nacre," Nature Materials, vol. 2, No. 6, pp. 413-418 (Jun. 2003) (published online May 25, 2003).

(Continued)

*Primary Examiner* — Jennifer Chriss
*Assistant Examiner* — Camie Thompson
(74) *Attorney, Agent, or Firm* — Harness, Dickey & Pierce, P.L.C.

(57) ABSTRACT

A stiff layered polymer nanocomposite comprising a substrate adapted to receive a plurality of alternating layers of a first material and a second material; wherein the first material and second material are a polyelectrolyte, an organic polymer or an inorganic colloid and said first material and said second material have a chemical affinity for each other, said plurality of layers crosslinked using a chemical or physical crosslinking agent. Thin films that are consolidated and optionally crosslinked can be manufactured into hierarchical laminates with rigid and stress resistant properties.

22 Claims, 15 Drawing Sheets

(51) Int. Cl.
*C08J 5/00* (2006.01)
*B82Y 30/00* (2011.01)
*C09D 5/18* (2006.01)
*C09D 7/12* (2006.01)
*C08K 3/04* (2006.01)
*C08K 3/22* (2006.01)
*C08K 3/34* (2006.01)

(56) References Cited

U.S. PATENT DOCUMENTS

| | | | |
|---|---|---|---|
| 2003/0027011 A1* | 2/2003 | Kotov et al. | 428/594 |
| 2004/0038007 A1* | 2/2004 | Kotov et al. | 428/174 |
| 2004/0053037 A1* | 3/2004 | Koch et al. | 428/323 |
| 2004/0206942 A1 | 10/2004 | Hsu | |
| 2010/0098902 A1* | 4/2010 | Kotov et al. | 428/105 |
| 2010/0098925 A1* | 4/2010 | Fasulo et al. | 428/220 |
| 2010/0129625 A1* | 5/2010 | Zhu | 428/215 |
| 2011/0114244 A1* | 5/2011 | Yoo et al. | 156/60 |

OTHER PUBLICATIONS

Nam, Sang Yong et al., "Pervaporation and properties of chitosan-poly(acrylic acid) complex membranes," Journal of Membrane Science, vol. 135, No. 2, pp. 161-171 (1997) (Abstract only).

Huang, Yihong et al., "Thermal and mechanical properties of cationic guar gum/poly(acrylic acid) hydrogel membranes," Polymer Degradation and Stability, vol. 92, No. 6, pp. 1072-1081 (2007) (Abstract only).

Podsiadlo, Paul, et al., "Ultrastrong and Stiff Layered Polymer Nanocomposites," Science, vol. 318, pp. 80-83 and Supporting Online Material (12 pages) (Oct. 5, 2007) (downloaded Oct. 5, 2007).

Huang, Yihong et al., "Thermal and mechanical properties of cationic guar gum/poly(acrylic acid) hydrogel membranes," Polymer Degradation and Stability, vol. 92, No. 6, pp. 1072-1081 (2007).

Nam, Sang Yong et al., "Pervaporation and properties of chitosan-poly(acrylic acid) complex membranes," Journal of Membrane Science, vol. 135, No. 2, pp. 161-171 (1997).

Rosidian, Aprillya et al., Ionic Self-Assembly of Ultrahard $ZrO_2$/Polymer Nanocomposite Thin Films, Oct. 1998, Advanced Materials, vol. 10, Issue 14, pp. 1087-1091.

Rosidian, Aprillya et al., Ionic Self-Assembly of Ultrahard ZrO2/Polymer Nanocomposite Thin Films, Oct. 1998, Advanced Materials, vol. 10, Issue 14, pp. 1087-1091 (abstract only).

\* cited by examiner

Strength : 263 MPa

Modulus : 12.2 GPa

Strain : ~ 8%

Type 2 [Mw 145,000 PVA/SWNT-COOH+PSS] 300

Strength : 285 MPa

Modulus : 4.7 GPa

Strain : ~ 9%

ULTRASTRONG AND STIFF LAYERED POLYMER NANOCOMPOSITES AND HIERARCHICAL LAMINATE MATERIALS THEREOF

GOVERNMENT SUPPORT

This invention was made with government support under grants FA9550-05-1-0143 from the Air Force Office of Scientific Research and N00014-06-1-0473 from the Office of Naval Research. The government has certain rights in the invention.

FIELD

The present disclosure relates to hierarchical assembled laminates and nanocomposite materials and methods for using and making the same.

BACKGROUND

The statements in this section merely provide background information related to the present disclosure and may not constitute prior art.

A critical challenge in nanocomposite fabrication is the ability to realize materials that allow the transfer of the exceptional mechanical properties i.e. tensile strength, $\sigma$UTS, and Young's modulus, E, of the nanoscale materials to the macroscale properties of the bulk materials. Nanoparticle-filled polymer composites based on these structural elements have mechanical properties that fall far below the expected theoretical and experimentally determined values of the individual building blocks, except at low reinforcement volume fractions. The deficiency in the properties of the composite is largely related to the difficulty of obtaining well-dispersed large volume fractions of the reinforcing nanomaterials and a lack of structural control. The difficulty is also associated with realizing an effective load transfer from the polymeric matrix to the nanoscale components and the insufficiently understood mechanical interactions of the two constituents at the nanoscale. We demonstrate that it is possible to produce composites with properties that approach the theoretical maxima using spatial and orientational control of clay platelets in a polymer matrix at the nanoscale and retaining this order at the macroscale.

Hybrid organic-inorganic nanocomposites of polymer and clay nanoplatelets have received special attention because of the very low cost of the inorganic component, relatively simple preparation, and fairly predictable stiffening behavior when introduced into polymers. Montmorillonite clay (MTM ~1 nm thick by 100-1000 nm diameter sheets), has been extensively used for this purpose because it is readily available and has exceptional mechanical properties. The in-plane modulus of elasticity has been estimated by Monte Carlo simulations to be ~270 GPa. While composites incorporating 50 vol. % of MTM should theoretically have stiffness values on the order of 100 GPa, values achieved to date with MTM platelets are at least an order of magnitude lower. This is because in general less than ~10 wt. % of clay can be incorporated homogeneously as completely dispersed silicates rather than intercalated structures into the polymer due to the strong tendency of the clay to aggregate and phase separate. Further increases in the volume of clay content have either marginally increased or even reduced both the strength and stiffness.

SUMMARY

The present technology provide nanocomposite films, bilayers, and consolidated laminates. In one aspect, a stiff layered polymer nanocomposite comprises a substrate adapted to receive a one or more alternating layers of a first material and a second material. The materials can be a polyelectrolyte, an organic polymer or an inorganic colloid. The first material and the second material can be said to have a chemical affinity for each other, for example electrostatic and/or covalent attraction, for example, hydrogen and Van der Waals bonding In another aspect the present technology describes a fiber reinforced structural laminate (Type A) comprising a plurality of multi-scale fiber reinforced lamina, the reinforced lamina can comprise a thin polymer nanocomposite film disposed between the reinforced lamina. The reinforced lamina is alternatingly arranged between the nanocomposite film and the reinforced lamina and nanocomposite film can be co-cured to form the structural laminate.

In a further aspect, the present technology provides for a fiber reinforced structural laminate (Type B) comprising: a plurality of multi-scale fiber reinforced lamina, the reinforced lamina comprises a plurality of fibers admixed with one or more polymers. The polymers can include polyamide, bismaleimide and polyurethanes. The one or more multi-scale fiber reinforced lamina is oriented in a configuration and the entire structure of lamina is cured to form the laminate.

In another aspect, a method for making a stiff thin film is provided. The method comprises providing a generally solid or semi-solid compatible substrate material. The substrate is coated with a compatible first material and alternating the first coating with a second coating of a second material, wherein the first material and the second material have a chemical affinity; and drying said film after a plurality of alternating coatings have been applied to said substrate. The thin film can contain one or more alternating coatings of first and second materials. The method further includes removing the thin film from the substrate; hydrating the thin film in a liquid; stacking a plurality of hydrated thin films thereby forming a stack of thin films; and consolidating the stack of thin films to form a hierarchical laminated composite.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 5:
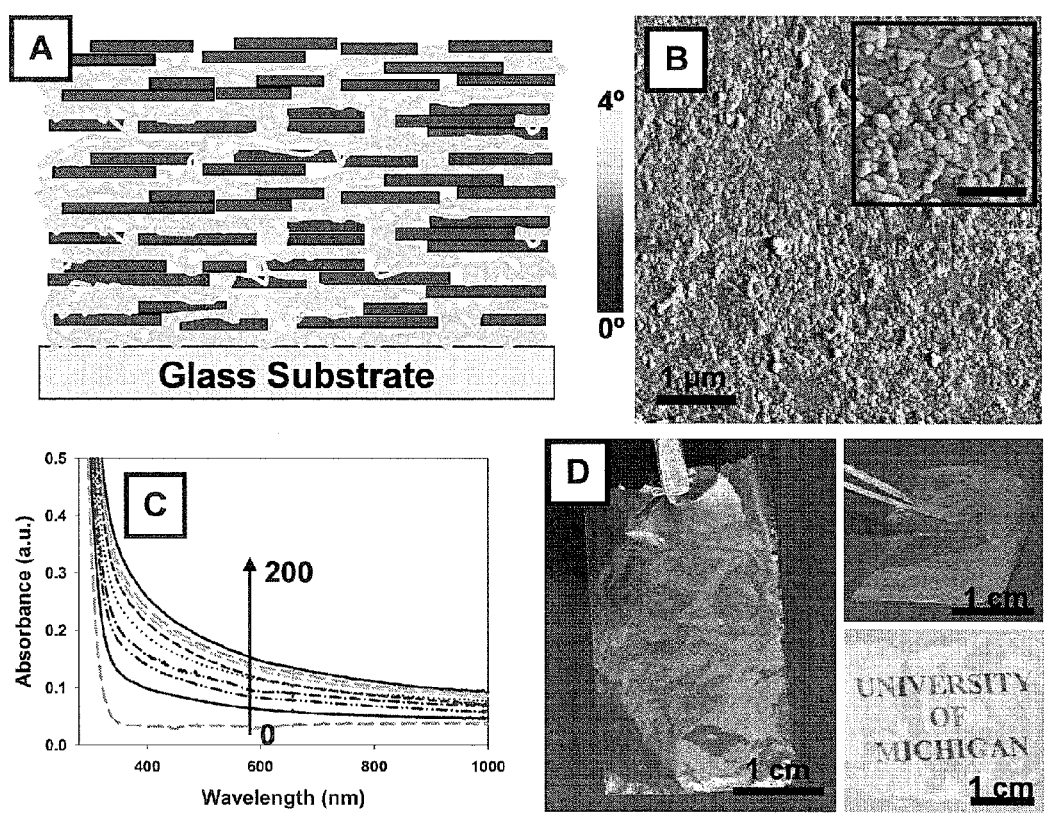
FIG. 5A depicts preparation of PVA-MTM nanocomposites. This figure represents a schematic representation of the internal architecture of the PVA-MTM nanocomposite (FIG. 1A shows 8 bilayers).

FIG. 5B depicts an atomic force microscopy phase micrograph of a single PVA-MTM bilayer adsorbed on top of a silicon wafer. The inset represents a close up of the main image showing individual MTM platelets more clearly. The scale bar in the inset corresponds to 400 nm.

FIG. 5C depicts a compilation of UV-Vis absorbance spectra collected after multiples of 25 bilayers of PVA-MTM composite deposited on both sides of a microscope glass slide up to 200 bilayers.

FIG. 5D depicts a free-standing, 300-bilayer PVA-MTM composite film showing high flexibility and high transparency. Lower image is taken at an angle to show diffraction colors.

Figure 6:
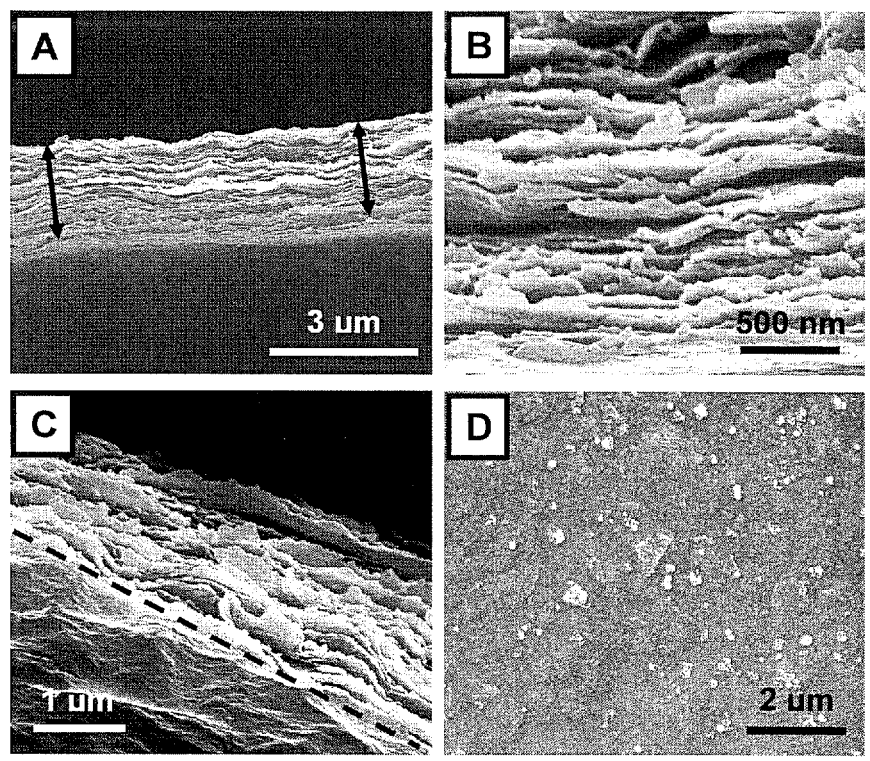

FIG. 6A depicts a scanning electron microscopy characterization of a 300-bilayer, free-standing PVA-MTM nanocomposite. (A) Cross-section of the film. Arrows indicate span of cross-section.

FIG. 6B depicts a scanning electron micrograph of a close-up of the cross-section showing separation of layers.

FIG. 6C depicts a scanning electron micrograph of a top-down view of a fracture edge of the composite after tensile testing. Dashed line indicates edge of the sample.

FIG. 6D depicts a scanning electron micrograph of the top-down view of the composite's surface.

Figure 7:
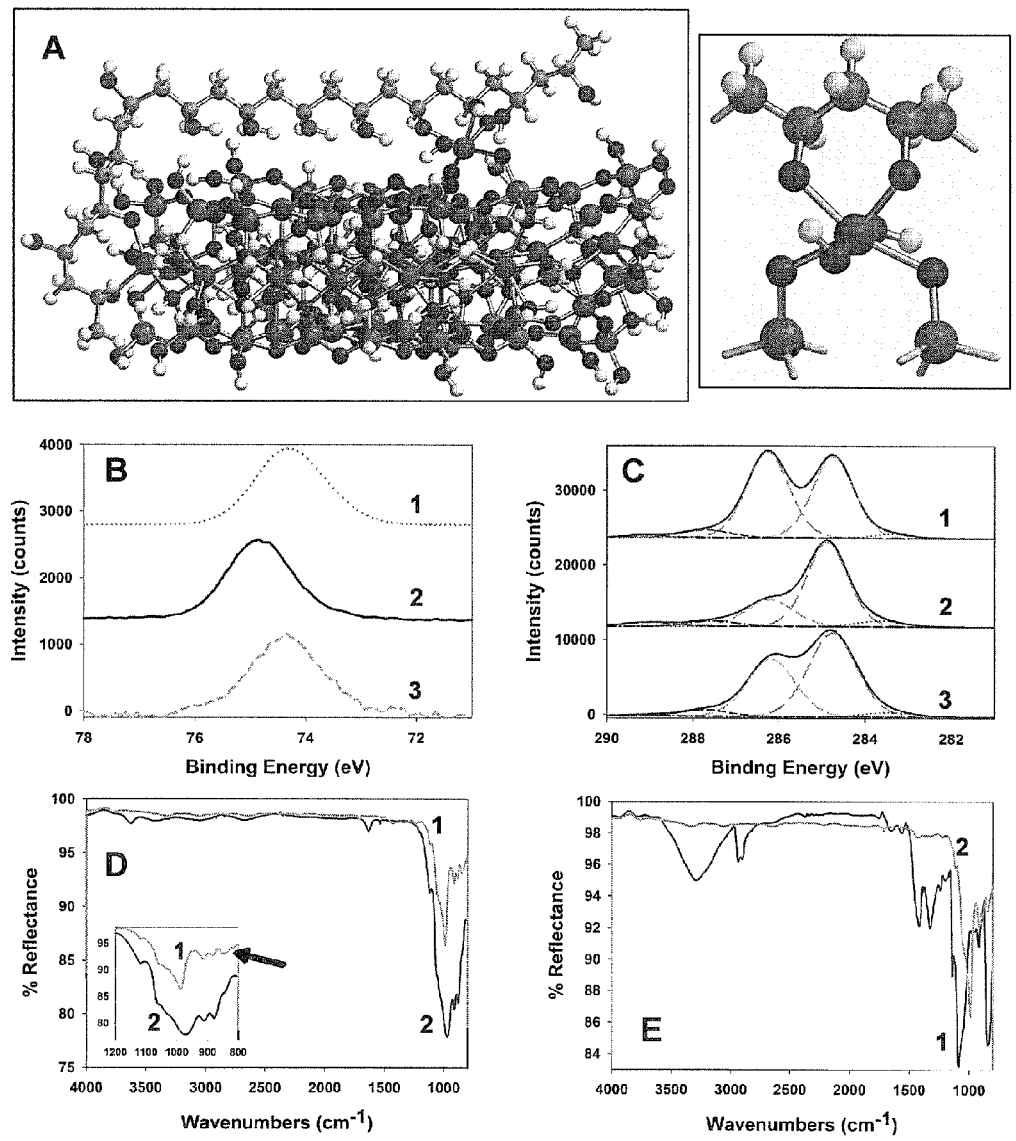

FIG. 7A depicts a stick and ball structural characterization of PVA and MTM molecular interactions. The Energy-optimized geometry of bonding between PVA and MTM via Al substitution sites obtained by computer calculations using the AM1 semi-empirical algorithm. In the inset: enlarged portion of the 6-member cycle formed between PVA and MTM. Atoms: Al—purple, O—red, H—light grey, Si,—dark grey, C—green.

FIG. 7B depicts graphical representation of an Al 2p XPS spectra for: (1) MTM, (2) PVA-MTM nanocomposite, and (3) PVA-MTM nanocomposite with GA cross-linking. Positive energy shift is indicative of increased oxidation state of the Al.

FIG. 7C depicts a graphical representation of a C is XPS spectra for: (1) PVA, (2) PVA-MTM composite and (3) PVA-MTM composite with glutaraldehyde (GA) cross-linking. XPS spectra were deconvoluted in component peaks corresponding to the different oxidation states of C. The major peaks at 284.8 eV and 286.2 eV correspond to —C—$H_2$ and —C—O—H carbons.

FIG. 7D depicts graphical representation of a comparison of FTIR spectra for (1) PVA-MTM composite and (2) MTM. Inset shows a close-up of the major peaks. Arrow points to the characteristic vibration peak at 848 $cm^{-1}$.

FIG. 7E depicts a graphical representation of the comparison of FTIR spectra for pure PVA (1) and PVA-MTM composite (2). The spectrum of PVA-MTM shows suppression of the C—O—H vibrations due to covalent binding with MTM surface.

Figure 8:
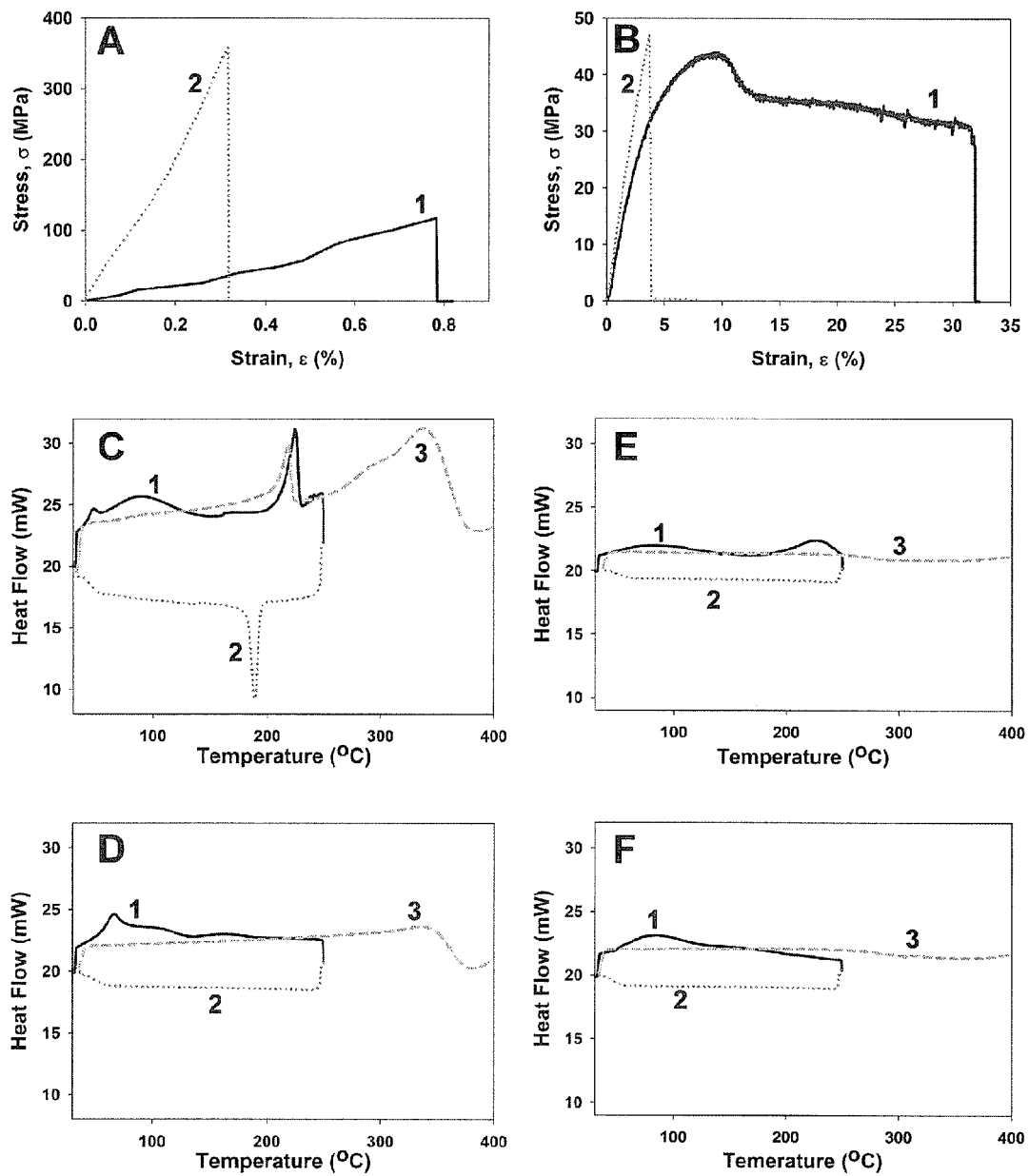

FIG. 8A depicts a graphical representation of the mechanical and thermal properties of PVA and PVA-MTM nanocomposites. (A) Stress-strain curves for 300-bilayer PVA-MTM composites without (1) and with (2) GA cross-linking.

FIG. 8B depicts a graphical representation of the stress-strain curves for pure PVA polymer without (1) and with (2) GA cross-linking. The stress-strain curves are obtained from a home-built tensiometer (see SOM).

FIGS. 8C-8F. Differential scanning calorimetric analyses results for PVA polymer without (C) and with (D) GA cross-linking and for PVA-MTM without (E) and with (F) GA cross-linking. The DSC scans follow heat (1)-cool (2)-heat (3) cycles as indicated by the numbering on the graphs.

Figure 9:
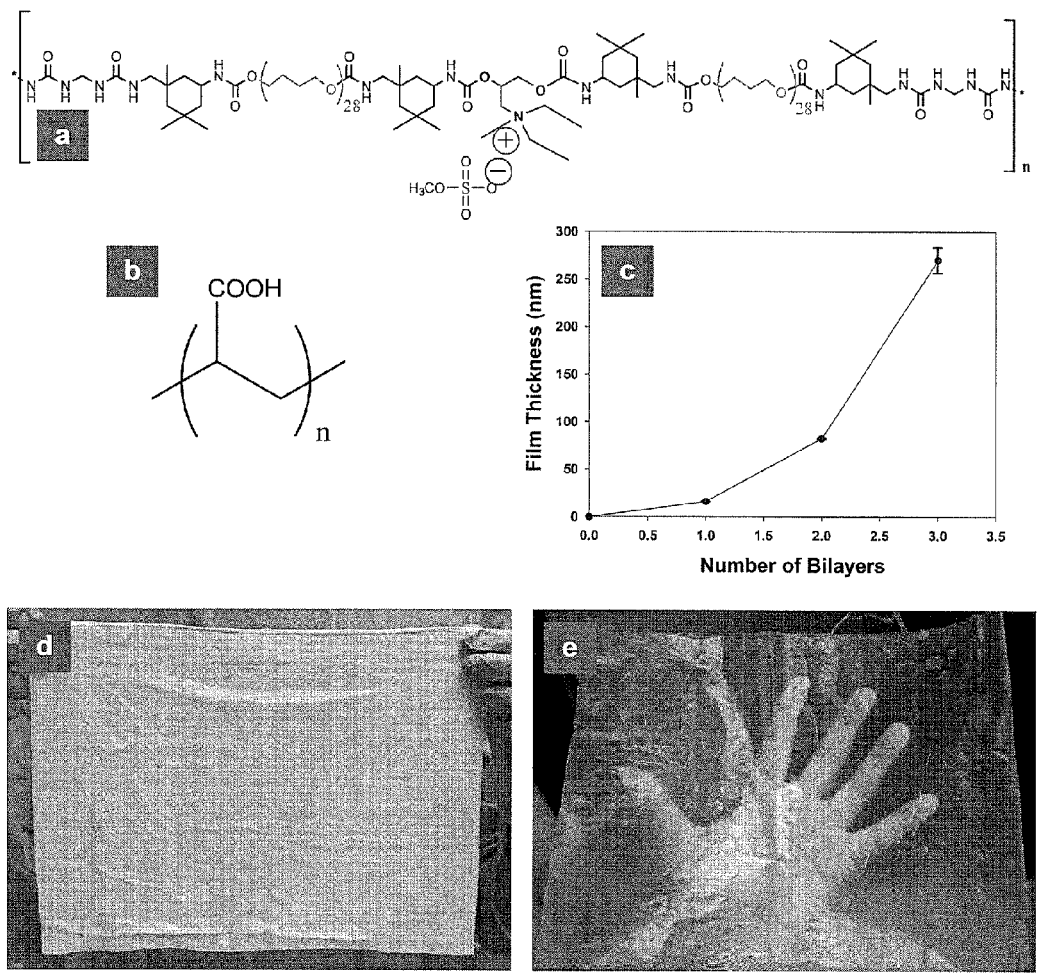

FIG. 9A shows Chemical structure of the cationic polyurethane copolymer. The cationic functional group of the polymer is highlighted in red, the counter-ion in blue, and the soft segments in green.

FIG. 9B shows the chemical structure of poly(acrylic acid).

FIG. 9C shows a plot of film growth on top of polished silicon substrate showing rapid increase in thickness.

FIG. 9D is a photograph of a 200-bilayer, hydrated polyurethane/poly(acrylic)acid (PU/PAA) free-standing sheet grown on 12 in×12 in glass substrate.

FIG. 9E shows a photograph of a100-bilayer, dried PU/PAA free-standing sheet grown on the same 12 in×12 in glass substrate as in FIG. 9C.

Figure 10:
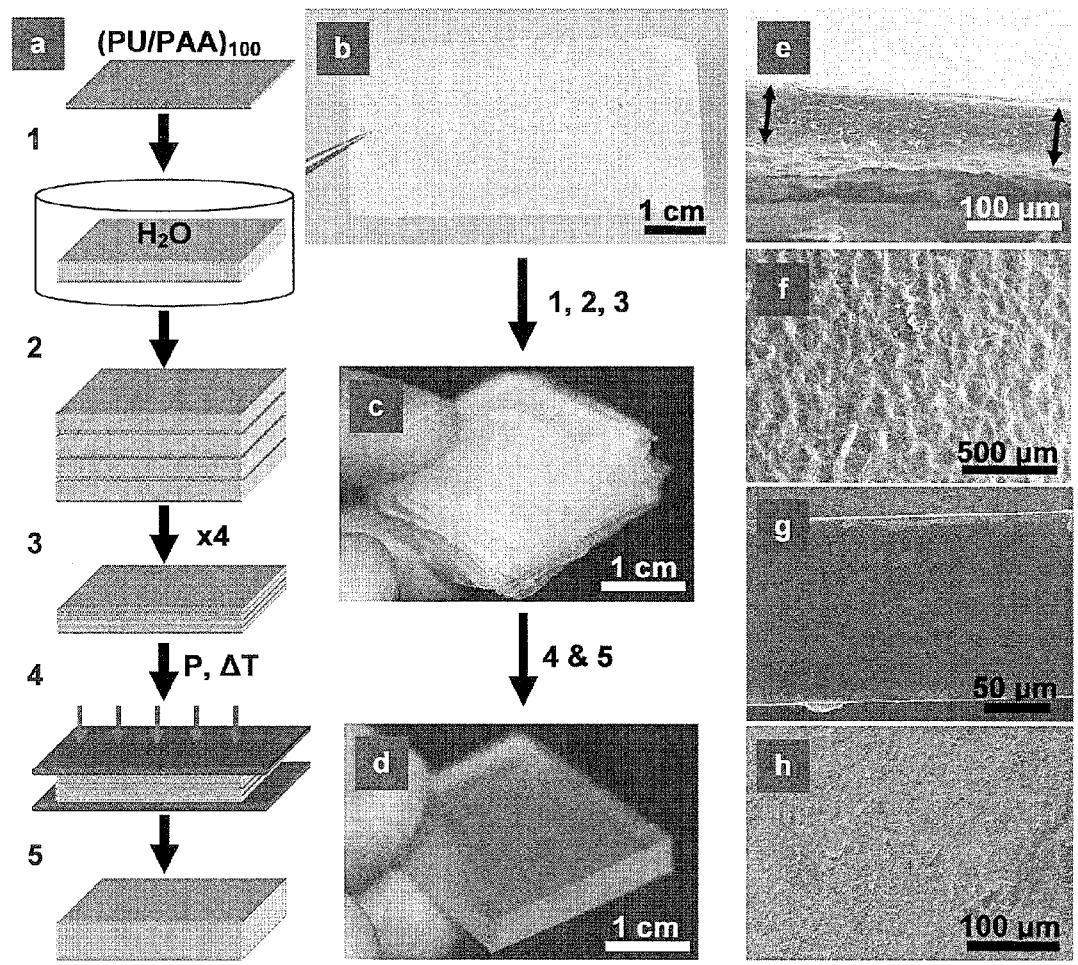

FIG. 10A shows a simplified schematic flow chart of one embodiment of a method of the present technology. Consolidation of free-standing PU/PAA films: (1) The films are allowed to swell in water for ~1 h; (2) Any number of films are stacked together into a sandwich structure to achieve conformal overlap; (3) The stack is dried at 100° C. under vacuum to remove any bubbles; (4) The dried stack is hot-pressed at 110° C. and <2 tons of pressure; (5) Final consolidated stack is removed from the press.

FIG. 10B-10D shows the representative results obtained from the method steps outlined in FIG. 10A.

FIG. 10B is a photographs of a free-standing, 100-bilayer PU/PAA film before swelling.

FIG. 10C shows a photograph of a 100-100-bilayer, 1 in×1 in, free-standing films combined into a stack after swelling and drying.

FIG. 10D shows a Photograph of a final hot-pressed stack from c. The total thickness of this stack is ~4.1 mm and the total number of bilayers is 10,000.

FIG. 10E shows a photomicrograph of an SEM image of cross-section of a free-standing 100-bilayer PU/PAA film grown on microscope class slide. arrows indicate the span of the cross-section.

FIG. 10F shows a photomicrograph of an SEM image of the single 100-bilayer film in e revealing high surface roughness.

FIG. 10G shows a photomicrograph of an SEM image of cross-section of a consolidated sample composed of 5×100-bilayer PU/PAA films. The image shows complete coalescence of the interfaces between individual films.

FIG. 10H shows a photomicrograph of an SEM image of the top surface of the consolidated sample in FIG. 10G.

Figure 11:
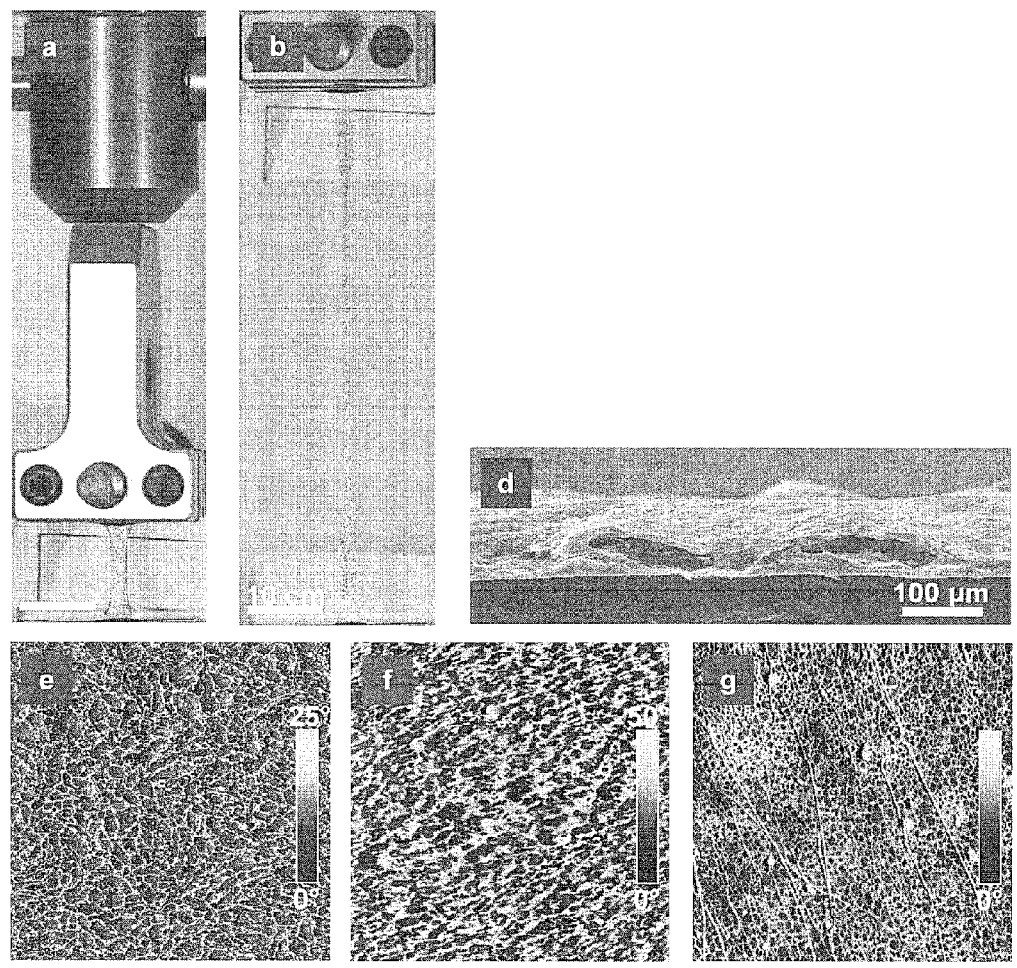
Figure 11:
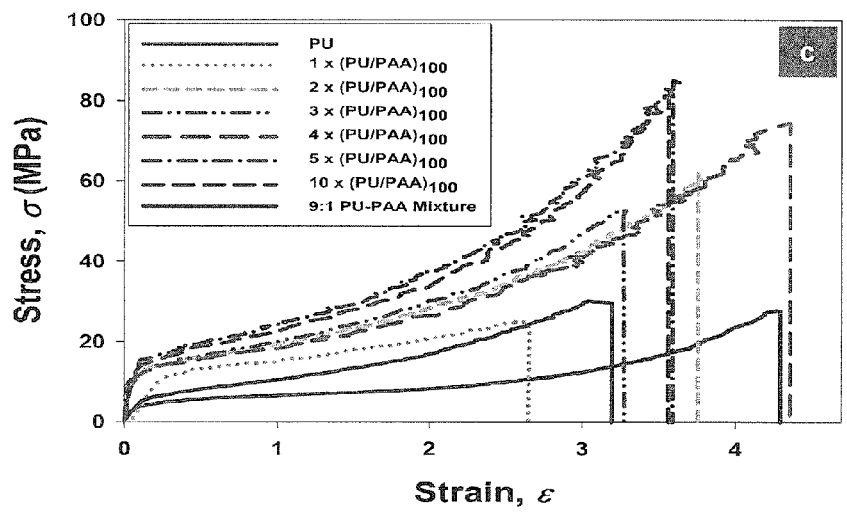

FIG. 11A shows a photograph of a dog-bone specimen of a 10-film consolidated sample prior to tensile test.

FIG. 11B shows a photograph of the dog-bone specimen from FIG. 11A prior to rupture. Both images of FIG. 11A and FIG. 11B were taken at the same magnification and focal distance. The black dots on the surface of the specimens are paint marks which were used to accurately track the strain response.

FIG. 11C shows a graphical plot of stress-strain responses for pure polyurethane and consolidated samples composed of 1, 2, 3, 4, 5, and 10 films.

FIG. 11D shows a photomicrograph of an SEM image of the single, 100-bilayer film revealing cavities in the interior of the film.

FIG. 11E shows the data output of Phase-contrast atomic force microscopy (AFM) images of surface morphologies for PU.

FIG. 11F shows the data output of Phase-contrast atomic force microscopy (AFM) images of surface morphologies for 9:1 PU-PAA mixture.

FIG. 11G shows the data output of Phase-contrast atomic force microscopy (AFM) images of surface morphologies for 5-sheet hot-pressed stack of e-LBL films.

Figure 12:
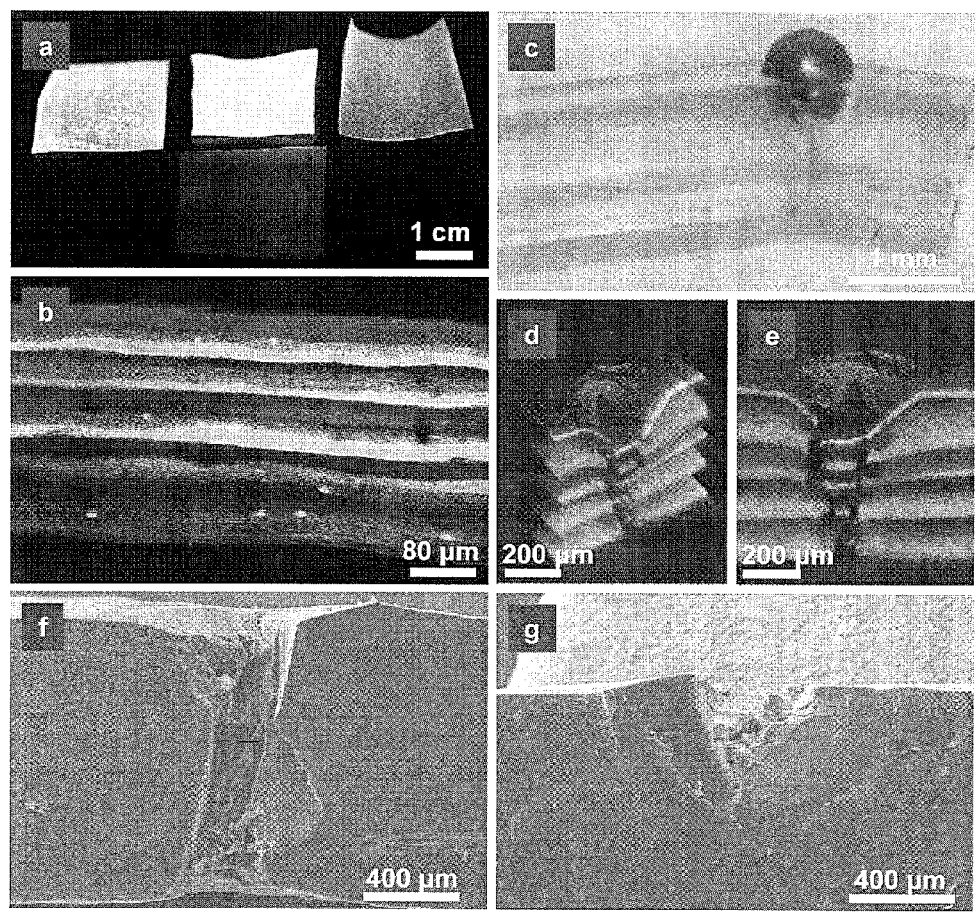

FIG. 12A shows a photograph of fluorescent-dye-labeled, 100-bilayer PU/PAA e-LBL films, and a consolidated stack under UV light (365 nm) illumination. Top row: left: FITC-labeled 100-bilayer film, center: consolidated stack composed of 10, 100-bilayer dye-labeled films, and right: TRITC-labeled 100-bilayer film. Bottom: plain 100-bilayer film. The composite was prepared by alternate stacking of the dye-labeled films into a (FITC-/TRITC-)$_5$ structure.

FIG. 12B shows a microphotograph of a laser-scanning confocal microscopy image of a cross-section of the dye-labeled 10-film alternating stack from FIG. 12A.

FIG. 12C shows a photograph of cross-section of a consolidated stack composed of alternating layers of FITC- and TRITC-labeled 100-bilayer films separated at every point by 3, not-labeled 100-bilayer films. For demonstration purposes a steel ball has been pressed into the film using a hydraulic press. The TRITC-labeled films are clearly visible as red bands.

FIG. 12D shows a photomicrograph of a confocal microscopy 3D image of cross-section around the damage caused by the steel ball in FIG. 12C.

FIG. 12E shows a photomicrograph of a confocal microscopy 3D image of cross-section around the damage caused by the steel ball in and 12F FIG. 12F shows a photomicrograph of a cross-section SEM image of the damaged area from steel ball in FIG. 12C.

FIG. 12G shows a photomicrograph of a top-down SEM image of the damage caused by the steel ball shown in FIG. 12C.

Figure 13:
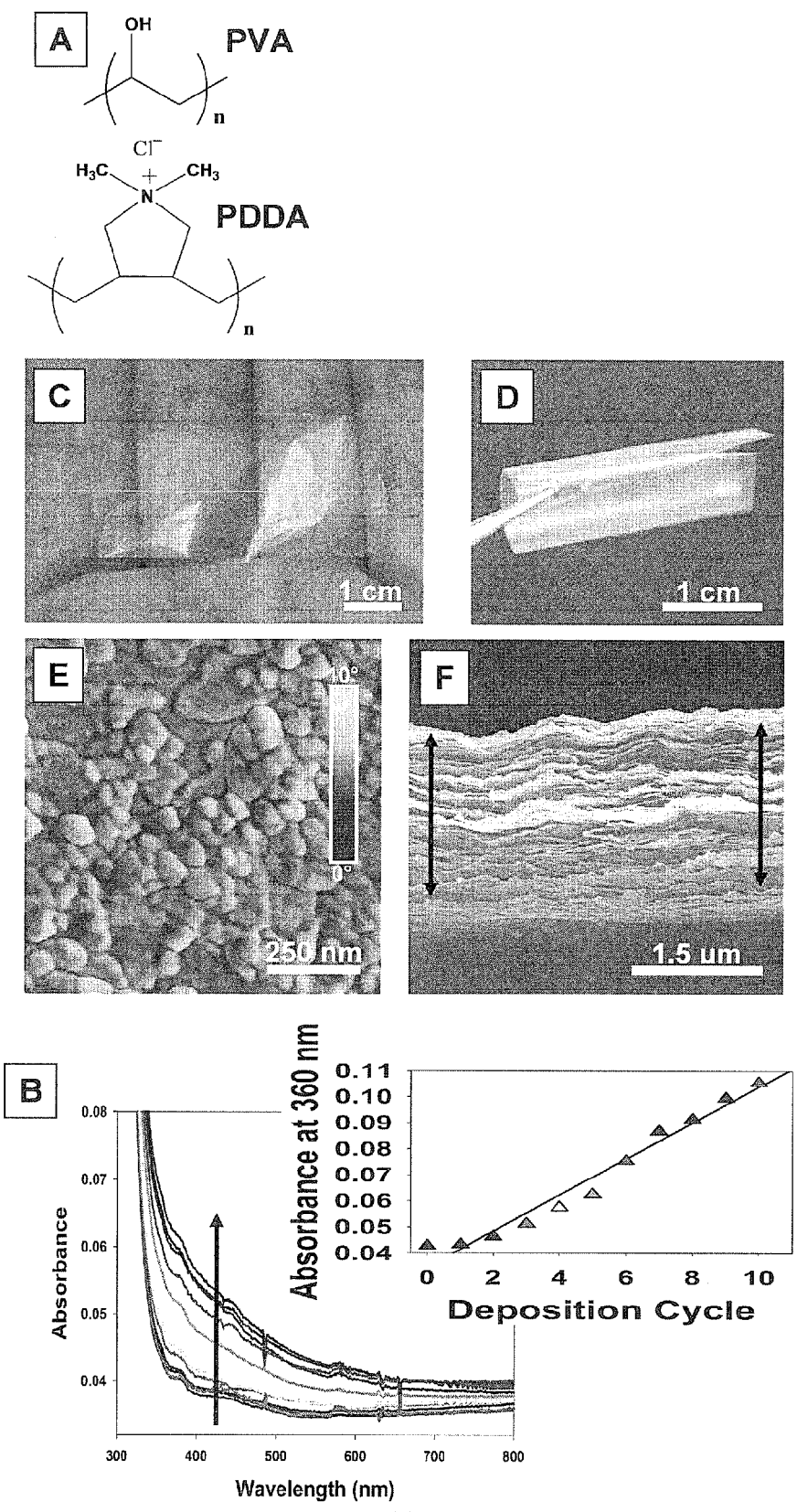

FIG. 13A shows the structure of PVA and PDDA polymers used in accordance with the present technology.

FIG. 13B shows a UV-vis spectra for the first 10 bilayers of deposition (arrow indicates increase of absorbance, inset represents absorbance at 360 nm as a function of bilayer).

FIG. 13C is a photograph of a free standing film of (PVA/MTM)$_{300}$ showing very high transparency and flexibility FIG. 13D is a photograph of the same free standing film of FIG. 13C allowed to coil.

FIG. 13E is raw data output of an AFM phase image of a single PVA/MTM bilayer.

FIG. 13F shows a photomicrograph of an SEM image of cross-section of a 300-bilayer PVA/MTM composite showing laminar architecture. The films in SEM can be slightly expanded due to separation of layers resulting from the shearing force of the razor blade used for cutting test samples.

Figure 14:
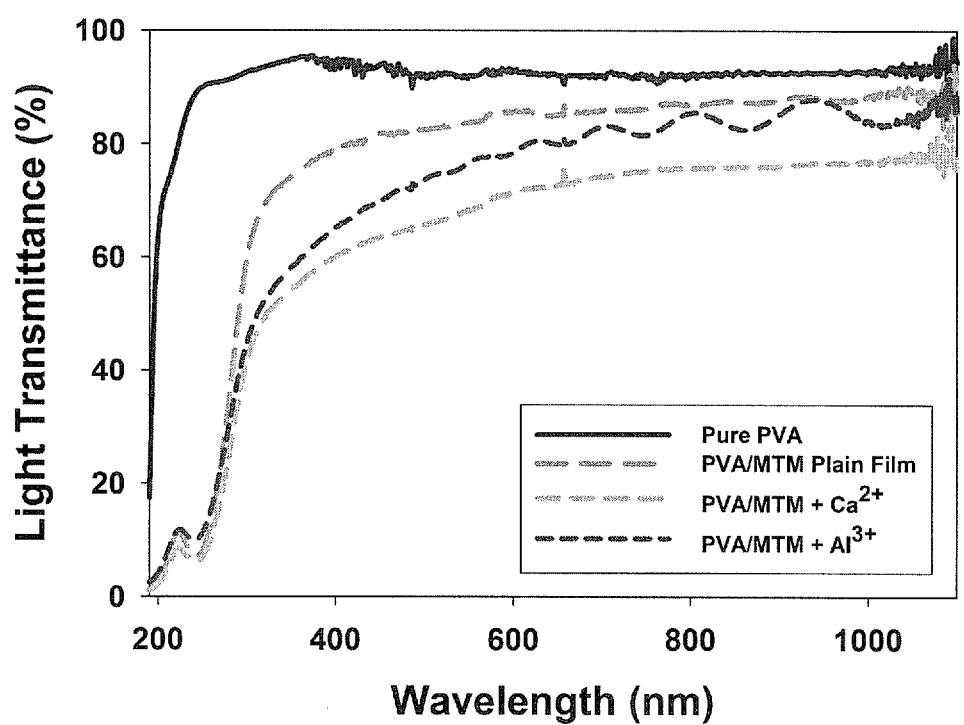

FIG. 14 shows a graph illustrating the comparison of UV-vis transmittances for selected (PVA/MTM)$_{300}$ films and pure PVA film.

Figure 15:
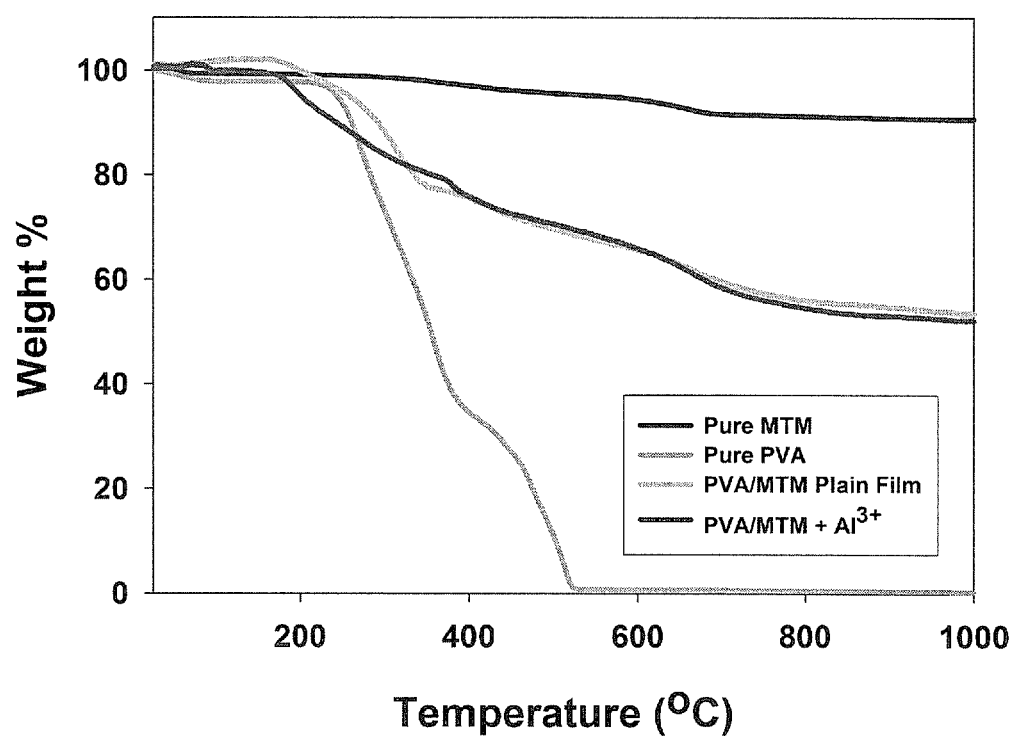

FIG. 15 shows a graph illustrating thermal gravimetric (TGA) results for a PVA/MTM composite with and without $Al^{3+}$ cross-linking, pure MTM powder, and pure PVA.

Figure 16:
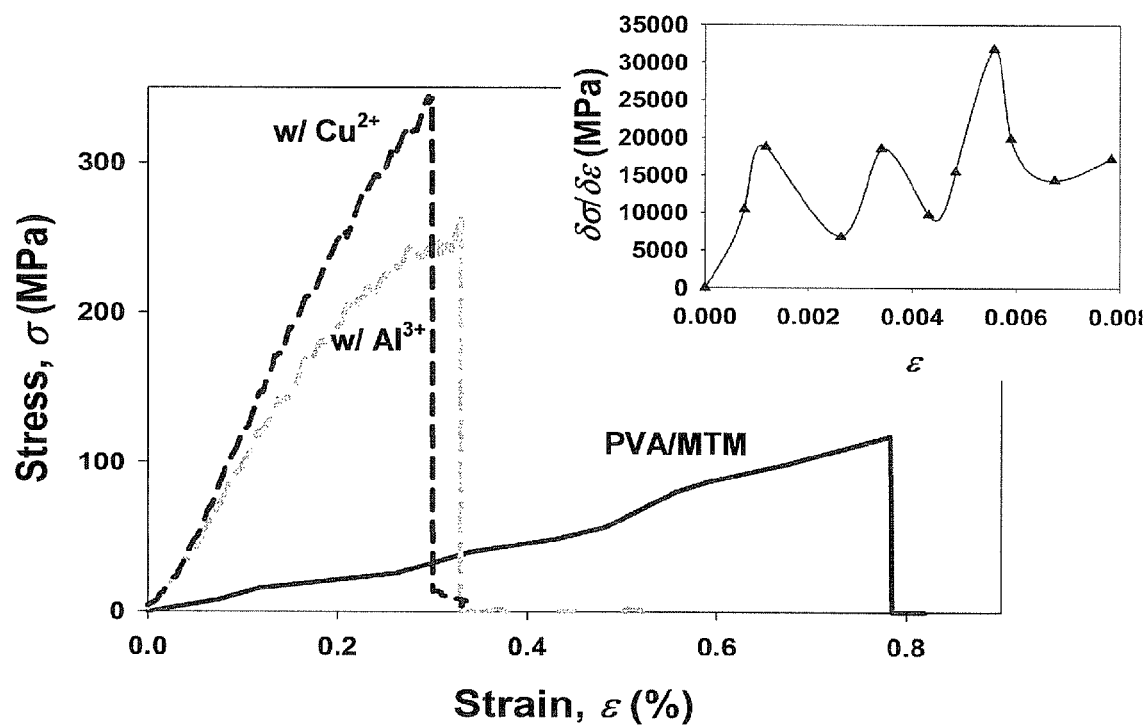

FIG. 16 shows a graphical comparison of stress-strain curves for PVA/MTM films with indicated cross-linkers. Inset shows the differential of the PVA/MTM stress-strain curve revealing the characteristic saw-tooth pattern.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

The headings (such as "Introduction" and "Summary") and sub-headings used herein are intended only for general organization of topics within the present technology, and are not intended to limit the disclosure of the present technology or any aspect thereof. In particular, subject matter disclosed in the "Introduction" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. Any discussion of the content of references cited in the Introduction is intended merely to provide a general summary of assertions made by the authors of the references, and does not constitute an admission as to the accuracy of the content of such references. All references cited in the "Description" section of this specification are hereby incorporated by reference in their entirety.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Although the open-ended term "comprising," as a synonym of terms such as including, containing, or having, is use herein to describe and claim the present invention, the invention, or embodiments thereof, may alternatively be described using more limiting terms such as "consisting of" or "consisting essentially of" the recited ingredients. The present technology describe hierarchical laminates composed of nanosheets or films that can be composed of polyelectrolytes and nanocomposites such as carbon nanotubes and other charged and neutral polymers.

In some embodiments, various monolayers of oppositely charged materials (including polyelectrolytes, charged nanoparticles, biological macromolecules and the like) can be made into thin films using the layer-by layer (LBL) process of nanocomposite manufacturing. Although oppositely charged polyelectrolytes can be alternatively incorporated into the LBL process, other chemically compatible species can also be used. For example, poly(vinyl alcohol) (PVA) is considered uncharged, however, PVA is a good candidate for the LBL process due to its hydrogen bonding with other compatible monomers and other chemical species that also utilize hydrogen bonding or van-der-Waals bonding.

The LBL process is based on sequential adsorption of nanometer-thick monolayers of oppositely charged compounds (e.g. polyelectrolytes, charged nanoparticles, biological macromolecules, etc.) to form a multilayered structure with nanometer-level control over the architecture. In some embodiments, the LBL assembly can be a method of thin film deposition which can be used to provide layers of oppositely charged polymers or polymers. The substrates used to deposit the thin films can include any compatible solid or semi-solid substrate. In some embodiments, substrates otherwise having affinity to a coating polymer or oppositely charged polyelectrolyte and can include a wide variety of natural and synthetic textured macro micro and nanofibers, nanoparticles, including single and multi-walled carbon nanotubes of various geometries and lengths, synthetic and natural membranes.

In various aspects, the LBL assembly method provides simplicity and universality, complemented by the high quality films produced thereby; make the LBL process an attractive alternative to other thin film deposition techniques. In some embodiments, LBL films can be assembled on a solid substrate material such as a glass slide or silicon wafer. Deposition of the film material onto the substrate is performed in a cyclic manner, made possible by the overcompensation of surface charge which often takes place when polyelectrolytes and other high molecular weight species are adsorbed on a solid-liquid interface. A canonical LBL process can include, 1. taking an inert support having been cleaned with an appropriate solvent to remove surface contaminants, 2. casting a solution of a substrate material dissolved in a suitable solvent onto a surface of the support. Alternatively, a premade substrate can be used instead, provided the first reactant of the LBL process has some chemical affinity for the substrate; evaporating the solvent to leave a film of substrate on the surface of the support; 3. forming at least one layer of thin film material by the steps of 4. immersion of the substrate in a first aqueous solution or dispersion of a first substance, the first substance having an affinity for the substrate, so as to apply one layer of said first substance to the substrate; 5. rinsing the substrate with neat solvent; 6. immersion of the substrate in a second solution or dispersion of a second substance, the second substance having an affinity for the first substance, so as to apply one layer of said second substance upon said first substance; and 7. final washing with neat solvent; repeating the these steps to accumulate the desired number of layers of said first and second substances (or layers of differing substances of appropriate affinity) to achieve the required thickness or obtain the desired properties; 8. peeling the substrate and film from the support as a unit; and optionally, 9. immersion of the substrate and film in a suitable solvent which will dissolve the substrate material without harming the thin film.

The support may comprise glass, quartz, plastics or other suitable inert materials as are known in the art. When a soluble substrate is used, the substrate material is limited only by the conditions that it 1) is soluble in an organic solvent which will not harm the thin film material; and 2) has an affinity with the first applied substance forming the first film layer, serving as a foundation for the film.

The present technology takes the versatility and reproducibility of the LBL assembly process described above and is used to prepare films comprising alumosilicate nanosheets or films and are subsequently consolidated to form optically transparent materials with planar orientation of the alumosilicate films. These laminates possess exceptional mechanical properties. In some embodiments, the LBL technique can be used to prepare nanocomposites from single or multi-walled carbon nanotubes (CNTs) wherein the nanocomposites have the ultimate strength, σUTS is approximately ~220 MPa.

LBL Deposition of Inorganic-Organic Nanocomposite Materials

The present technology provide for thin films that can be consolidated for the production of hierarchical laminates that offer stiffness and tensile strength that are an order of magnitude greater than those for analogous nanocomposites at a processing temperature that is much lower than for ceramic or polymer materials with similar characteristics. A high level of ordering of the nanoscale building blocks combined with dense covalent and hydrogen bonding and stiffening of the polymer chains leads to nearly perfect load transfer between nanosheets and polymer. Some mechanical parameters are comparable to that of steel and ultrastrong plastics such as Kevlar.

Consolidation of Free Standing Films

Figure 1:
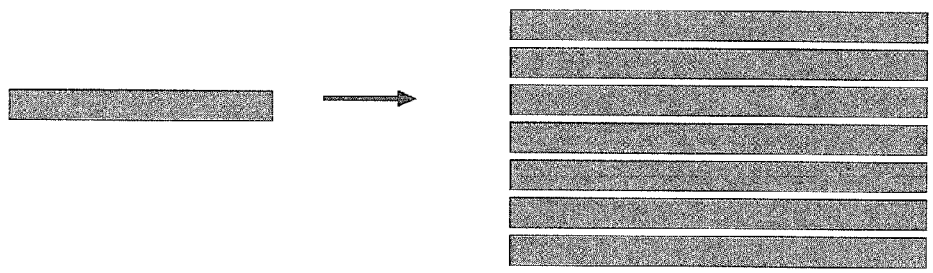
FIG. 1 is a graphical representation of free-standing films clay or other materials which can be consolidated into a multilayer laminate by using an adhesive or organic polymer and individually made sheets.
Figure 2A:
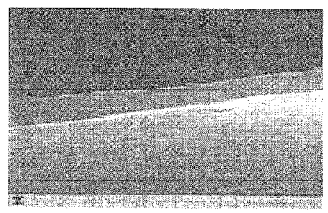
FIG. 2A depicts a scanning electron microscopy micrograph of [PVA/SWNT-COOH+PSS]$_{300}$ film.
Figure 2B:
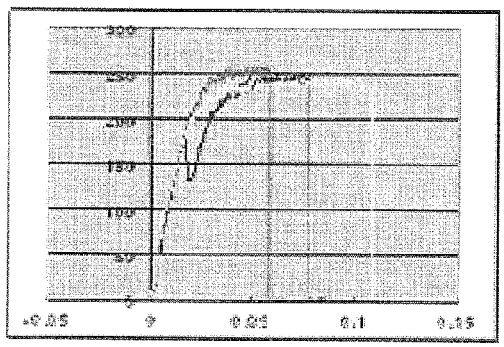
FIG. 2B depicts a graphical representation of the mechanical properties of the film presented in FIG. 2A.
Figure 3A:
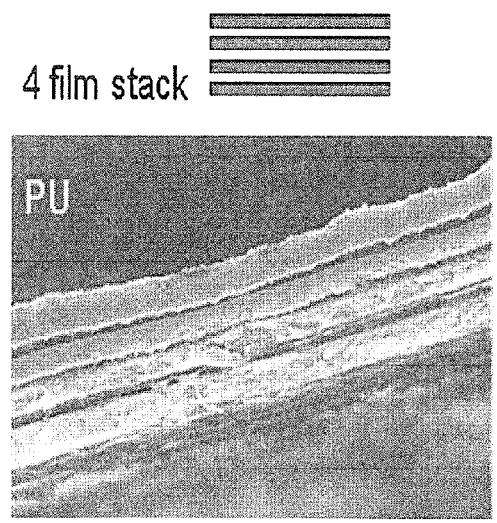
FIG. 3A depicts a scanning electron microscopy micrograph of 4 layers bonded with an adhesive such as polyurethanes, polyvinyl alcohol, epoxy resins, latexes, polyamids, polyimides.
Figure 3B:
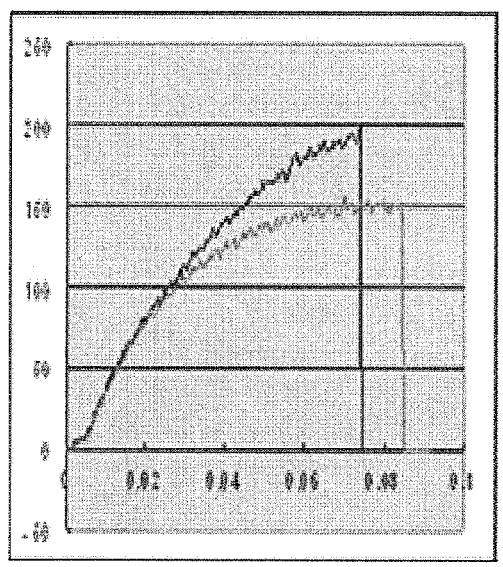
FIG. 3B depicts a graphical representation of the mechanical properties of the film presented in FIG. 3A.

Free-standing films using clay or materials with equivalent inorganic components, for example minerals composed of aluminum, silicon, and oxygen in any ratio can be made in accordance with the present technology for example amorphous silica, iron oxide, alumina, thoria, titania, zirconia. In some embodiments, the clay materials comprising aluminosilicates can include vermiculite, bentonite, montmorillonite, Na-montmorillonite, Ca-montmorillonite, hydrated sodium calcium aluminum magnesium silicate hydroxide, pyrophyllite, magnesium aluminum silicates, lithium aluminum silicates, zirconium silicates montmorillonite clay, andalusite, kyanite, hectorite and sillimanite aluminosilicate minerals, hydrated aluminosilicate minerals including zeolites and colloidal clays, colloidal kaolin, attapulgite or other materials which can be consolidated in the multilayer laminates by using an adhesive and individually made sheets as shown in (FIG. 1). This process can be illustrated by consolidation of the free-standing films from carbon nanotubes with mechanical properties presented in (FIGS. 2A and 2B). The consolidation results in retaining or even improving the mechanical properties of individual sheets as depicted in (FIGS. 3A and 3B). Examples of adhesives can include polymers such as polyurethanes, polyvinyl alcohol (PVA), epoxy resins, silicones, latexes, polyamides, polyimides. The adhesive layer can also include one or more of the nanoscale building blocks as well.

Films and laminate materials disclosed in the present technology can be crosslinked using various other methods, for example materials obtained from consolidation of the individually made films can be stacked together and subsequent bonding or curing with chemical or physical treatment which includes, but not limited to, using adhesives, thermal treatment, pressing, swelling, shearing, gluing, irradiating with UV, visible, X-ray, IR, alpha, gamma, beta radiation and other methods.

Preparation Of Carbon Nanotube Nanocomposites

LBL assembly of carbon nanotubes was first realized using partially oxidized, —COOH-bearing SWNT. It was estimated that ca. 5% of the total number of carbon atoms were oxidized. This oxidation renders such nanotubes negatively charged, and therefore, they can be assembled with positively charged polyelectrolytes such as branched poly(ethyleneimine), PEI. Adding poly(acrylic acid), PAA, layers into the multilayer stack improved the linearity and regularity of LBL deposition. PAA also presented a convenient chemical anchor for the subsequent cross-linking of the entire structure via strong amide bonds, which is believed to contribute to the outstanding mechanical properties observed in these materials. Cross-linking of PAA and PEI during temperature annealing step leads to in-situ formation of Nylon-type polymer and matrix cross-linking. In some embodiments, poly (styrenesulfonate) (PSS) and PVA can be used in the LBL assembly of SWNTs. Multilayers with a cumulative structure $[SWNT+PSS/PVA]_n$, where n is the number of deposition cycles, display the highest strengths possibly due to the fact that no oxidation of SWNTs is necessary for the preparation of such films. The chains of PSS tightly wrap the nanotubes around and form active interface for the load transfer.

A monolayer of SWNT is deposited in each deposition cycle. The final morphology of the multilayers can be described as predominantly individual carbon nanotubes interwoven together in a fine fabric. SWNT uniformly covers the entire surface of the substrate without any evidence of phase separation as can be seen in atomic force microscopy (AFM) images. High degree of de-bundling and uniform distribution over the surface should also be pointed out. Analogous uniformity and SWNT density were later seen in LBL assemblies reported by a research team at NASA, albeit with greater amount of carbonaceous colloids.

Multilayers assembled on glass or silica can be delaminated by HF treatment. They can be made of any desirable size or shape determined only by the dimensions of the substrate. The dimensions of the films can be made as large as the equipment used to control the iterative adsorption steps allows. In some embodiments, the size of the film sheets can be made as large as 20×25 cm. Free-standing films are convenient for the assessment of the tensile properties of these materials and other characteristics, for instance their composition.

LBL assemblies displayed SWNT content as high as 75 +/−5 wt % as calculated from thermogravimetric analysis (TGA). Previously reported composites made with modified SWNT revealed strong inhomogeneities even at SWNT loadings as low as 6-8%. The typical stress ($\sigma$) vs. strain ($\epsilon$) curves of SWNT films LBL films produced using the methods described herein can achieve a $\sigma_{ult}$=450-500 MPa, and $\epsilon$~14-21%. The high strength and resiliencnt structures are believed to be due in part by optimizing the method of their preparation aiming at better load transfer between the polymer matrix and the nanotubes. Incorporation of the stage of thermal annealing, which relaxes the polymers and makes them adhere stronger to the nanotubes made possible these advances. Also optimization of pH of assembly, degree of chemical crosslinking, and the strength of van der Waals interactions contributed to improvement of the load transfer. It is useful to note that the prepared LBL films demonstrate ultimate strength exceeding all the reported data for bulk composites and even $\sigma_{ult}$ for some of the fibers Hierarchical Structural Laminates In some embodiments, a new class of reduced weight, layered, tough, nano-scale polymer material systems designed to mitigate blast effects and to absorb large amounts of energy during deformation. The present technology provides for materials that comprise light weight fiber reinforced systems that can be manufactured to obtain desired macroscopic (anisotropic) structural stiffnesses for various applications. Two types of material systems will be introduced, where the polymer matrix material in the composite structure is altered at the nano-scale by the inclusion of nano-particles. In the first type, layer-by-layer (LBL) nanocomposite assembly is used to homogeneously incorporate large volume fractions of nanoparticles with planar orientation of the nanosheets to create thin films that are interspersed between the lamina of a layered fiber reinforced structure. In the second type, a new class of fiber reinforced lamina is manufactured by a judicious alteration of the LBL process. The result is a new multi-scale lamina (MSL) that includes both, micron level fibers and nano-reinforced polymer. MSL can also be lamina that contains microscopic scale fibers held together in a polymer matrix that is reinforced with nanoparticles. Stacks of MSL are co-cured to obtain thick (at the scale of mm's and cm's) structural panels for mitigating blast type loading. This fundamental approach to enhancing strength and toughness to mitigate effects of blast loading, starting at the nanoscale, has significant implications for the future design of armor and other blast resistant structures. The films can be made from unfilled polyamide, bismaleimide and polyurethane layered nanocomposites including the following nanoparticles; Montmorillonite clay (MTM), which is composed of ~1 nm thick by 100-1000 nm diameter sheets, and single or multi walled carbon nanotubes (SWNT & MWNT) vermiculite, kaolin, silica oxide, alumina oxide, molybdenum oxide, carbon nanoparticles, carbon fibers, graphene sheets, amorphous graphite, nanowhiskers, cellulose fibers, lignin, metal oxide nanoparticles/nanowires/nanotubes, semiconductor nanoparticles/nanowires/nanotubes, magnetic nanoparticles/nanowires/nanotubes. Carbon nanotubes, both single-wall (SWNT) and multi-wall (MWNT), are significantly stronger than carbon fiber. For example, the range of tensile strength values of nanotubes is 11-63 GPa, while for carbon fibers it is measured to be around 3.5 GPa. Incorporation of carbon nanotubes in a polymer matrix should result in greater mechanical performance of composite material. However, previous attempts to obtain such composite materials resulted in strong separation of the polymer and carbon nanotube phases, which led to premature mechanical failure. This is primarily attributed to poor polymer matrix-SWNT connectivity. Both problems can be successfully mitigated when the SWNT composite is made following a protocol of layer-by-layer assembly. Nanometer-scale uniform composites with SWNT loading as high as 50% can be obtained. Freestanding SWNT/polyelectrolyte membranes delaminated from the solution were unexpectedly found to be exceptionally strong. Dispersion, volume fraction and orientation of the nanoparticle phase will all be controlled in the nanocomposite manufacturing process. The interface properties can be varied to provide difference fracture toughness. The interface properties can be characterized through a combination of differential scanning calorimetry and grazing angle FT-IR analysis. The latter provides atomistic level information related to the bonds that form between the nanoparticles and the polymer.

In some embodiments, the present technology provides for new lightweight structural materials that possess enhanced and improved mechanical resistivity, for example, materials capable of high energy absorption and extreme mechanical loading. A new class of reduced weight, layered, tough, nanoscale polymer material systems designed to mitigate blast effects and to absorb large amounts of energy during deformation is described by the present technology. In some embodiments, the materials can be light weight fiber reinforced systems that can be manufactured to obtain desired macroscopic (anisotropic) structural stiffnesses for various applications.

The present technology provides for material systems where the polymer matrix material in the composite structure is altered at the nano-scale by the inclusion of nano-particles. In some embodiments, a LBL nanocomposite assembly method as described above can be used to homogeneously incorporate large volume fractions of nanoparticles for example MMT, SWNT and MWNT with planar orientation of the nanosheets to create thin films that are interspersed between the lamina of a layered fiber reinforced structure.

In some embodiments, the present methods provide for a new synthesis technique based on the LBL manufacturing process to develop a multi-scale fiber reinforced lamina (MSL). The lamina can consist of carbon and/or glass fibers with diameters (df) on the order of 4-12 micrometers that are spaced 1-20 micrometers apart. The spacing can be altered to control the fiber volume fraction, Vf. These spaces can be filled in with nanosheet/nanotube reinforced polymer. The base polymer can include unfilled polyamide, bismaleimide and polyurethanes, while the nanosheets or films described above, can include Montmorillonite clay (MTM), which is composed of ~1 nm thick by 100-1000 nm diameter sheets, and single walled carbon nanotubes (SWNT) with dimensions of 0.1-5.0 nm in diameter and 1-100 microns long. Dispersion, nanoparticle volume fraction, Vnf, and orientation of the nanoparticle phase can be automatically controlled in the nanocomposite manufacturing process. The effect of these variables (Vf, Vnf, and df, and, fiber and polymer mechanical properties) on the high strain rate response of the MSL and laminates made of MSL can be explored through mechanical testing.

Figure 4A:
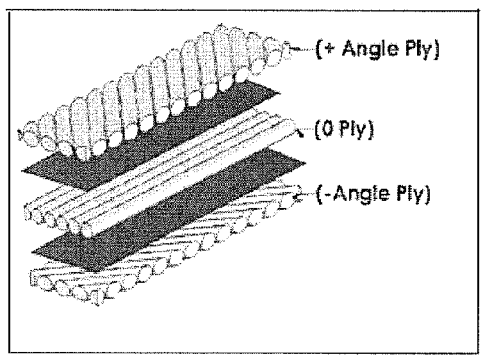
FIG. 4A depicts a concept of a layered fiber reinforced laminated structure with nanoscale designed interface layers (Type A) that are sandwiched between the fiber reinforced lamina. The nanocomposite films exhibit ultra-high toughness.
Figure 4B:
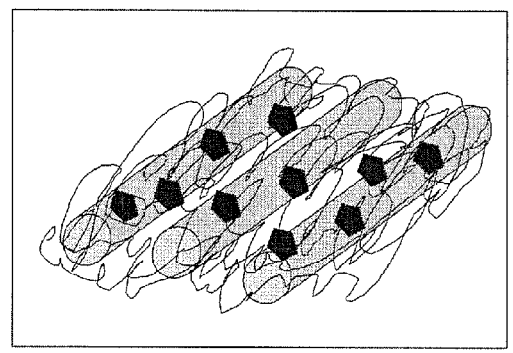
FIG. 4B depicts a new multi-scale lamina (MSL) that contains reinforcement fibers (maize color—microscale) and nanoparticle reinforced polymer.

In some embodiments, the present technology provide methods for producing articles comprising laminated made from MSL that can be classified into two classes of structural laminates. In the first class, referred to as Type A, pre-preg based fiber reinforced lamina that can be alternatively arranged as a stack with thin polymer nanocomposite films placed between the lamina (see FIG. 4A) and co-cured with a curing method for example, chemical, UV radiation or high temperature annealing (80° C. to 350° C.) such as to form a structural laminate. In the second class, referred to as Type B, stacks of multi-scale lamina (micron-level fibers and nano-reinforced polymer) are arranged according to desired fiber orientation angles and cured to form a new class of structural laminates (see FIG. 4B).

Applications

In some embodiments, the nanocomposite structures and thin films described above and exemplified in the Examples below can be tailored made to provide a variety of functions. Generally, these films can be made using relatively inexpensive reagents, and simplistic methods of manufacture. The thickness and transparency of the films can be controlled by the number of layers made on a given substrate. For example, for laminates and other composite materials, films comprising at least 5 layers, at least 10 layers, at least 30 layers, at least 50 layers, at least 75 layers, at least 100 layers, at least 150 layers, at least 200 layers, at least 300 layers, at least 500 layer and at least 1000 layers can be made using repetitive, automated LBL methods described herein. The films produced in accordance with the present technology are highly ductile and capable of withstanding high temperature, stress and shear. The following applications and uses are merely illustrative and many others can be envisioned requiring the advantageous properties of high tensile strength, a high Young's modulus and optical transparency.

Military and Civilian Personnel and Equipment Armor

Light weight composite structures, as well as hybrid composite structures that withstand high energy absorption, flexible, lightweight carbon and can be combined with other material and fiber substrates can be exploited for ballistic protection (armor) for personal protection during combat and national emergency and for military vehicles. Also of concern is the need for mobility and transportability of such composite structures (or even the vehicles and/or persons who might use such composite structures). Two types of material systems will be introduced, where the polymer matrix material in the composite structure is altered at the nano-scale by the inclusion of nano-particles. As described above, the layer-by-layer (LBL) nanocomposite assembly is used to homogeneously incorporate large volume fractions of nanoparticles with planar orientation of the nanosheets to create thin films that are interspersed between the lamina of a layered fiber reinforced structure. In the second type, a new class of fiber reinforced lamina is manufactured by a judicious alteration of the LBL process. The multi-scale lamina (MSL) that includes both, micron level fibers and nano-reinforced polymer. Stacks of MSL are co-cured to obtain thick (at the scale of cm's) structural panels for mitigating blast type loading. This fundamental approach to enhancing strength and toughness to mitigate effects of blast loading, starting at the nanoscale, has significant implications for the future design of armor and other blast resistant structures.

The films can be made from unfilled polyamide, bismaleimide and polyurethane layered nanocomposites including the following nanoparticles; Montmorillonite clay (MTM), which is composed of ~1 nm thick by 100-1000 nm diameter sheets, and single or multi walled carbon nanotubes (SWNT & MWNT). Carbon nanotubes, both single-wall (SWNT) and multi-wall (MWNT), are significantly stronger than carbon fiber. For example, the range of tensile strength values of nanotubes is 11-63 GPa, while for carbon fibers it is measured to be around 3.5 GPa. Using the LBL-process above in addition to the lamination steps outlined herein, stacks of MSL are co-cured to obtain thick (at the scale of mm's) can be produced that offer transparency and other significant mechanical properties such as yield strength; ultimate strength, Young's modulus and ultimate strain.

Membrane Surfaces For Microelectomechanical Systems (MEMS)

Traditional MEMS membrane devices can be fabricated using thin film surface micromachining techniques. For example, polysilicon layers are deposited over sacrificial silicon glass layers and the sacrificial layers are dissolved through a multitude of etch holes to allow the etchant to flow underneath the membranes. This etch process can affect required passivation of microelectronic components and the required holes need to be hermetically sealed after the etch release in some cases to prevent the device from malfunctioning. The aggressive chemical etch is typically performed with hydrofluoric acid (HF), which limits material choices for the designer. The problems associated with the membrane manufacturing can be overcome by utilizing LBL derived thin films comprising polyurethane/MMT derived films that are resistant to various physical and chemical stresses. Furthermore, patterned micrometer sheets of PU/MMT thin films provide the added advantage that they can be made to be transparent which makes them an ideal substitute for glass and silicon membranes.

Optical Electronic Components

Micro-optical electromechanical system (MEOMS) membranes and substrates for photonics/electronics and optoelectronics. In some embodiments, the optical properties of the films lend these films and membranes suitable for various optical applications such as space/aviation applications (including unmanned aerial vehicles, cockpit glass, elements of structural parts of the airplane. Due to the material's properties such as extreme toughness and resistance to stress and force described and illustrated above and in the Examples below. In some embodiments, the present films can be used as substrates that find utility in electrical conduction, for example, as electrode devices, as sensors. Currently, the most commonly used transparent electrodes are transparent conducting oxides (TCOs), specifically indium-tin-oxide (ITO) on glass. However, ITO can be an inadequate solution for many emerging applications (e.g., non-rigid solar cells due to ITO's brittle nature), and the indium component of ITO is rapidly becoming a scarce commodity. Moreover, deposition of transparent conducting oxides (TCOs) for minimal light loss normally requires a high-temperature sputtering process, which can severely damage underlying active layers. The present technology provides films of differing transparency and stress resistance that can be used in combination with conductive molecules and semi conducting molecules to provide flexible, strong, transparent conductive films and substrates. In some embodiments, the films of the present technology are ideally suited for solar cell devices. Thin film solar cells can be fabricated with relatively inexpensive materials on flexible surfaces made from the films described herein. The PU/PAA10-300 films described herein can be altered by incorporating a conductive compound. In some embodiments, conductive compounds can include metal particles or their alloys, conductive polymers such as poly(pyrrole), polyanilines, polyacetylenes, poly (diallyldimethylammonium chloride, poly-4-vinylpyridine, poly(vinylalcohol), polythiophenes, polymer blends thereof, and semi conducting and conducting metals and non metals known in the art having the ability to conduct current, voltage, charge or ions. The conductive compounds or compounds can then be admixed with their appropriate dopants and added to the PU and/or PAA solutions. The subsequent films are strong light absorbers and need only be about a micron thick, thereby reducing materials costs significantly. The polymers can also be admixed with several other well known conductive materials, for example, those based on silicon (e.g., amorphous, protocrystalline, nanocrystalline), cadmium telluride (CdTe), copper indium gallium selenide (CIGS), chalcogenide films of copper indium selenide (CIS), gallium arsenide (GaAs), light absorbing dyes, quantum dots, organic semiconductors (e.g., polymers and small-molecule compounds like polyphenylene vinylene, copper phthalocyanine and carbon fullerenes) and other non-silicon semiconductor materials. The films made by the LBL process described herein are generally amenable to large area deposition on rigid (e.g., glass) or flexible (e.g., PET) substrates, with semiconductor junctions formed in different ways, such as a p-i-n device (e.g., with amorphous silicon) or a hetero-junction (e.g., with CdTe and CIS). Regardless of the thin-film device architecture chosen, an at least semi-transparent conducting film of the present technology can be used to form a front electrical contact of the cell, so as to allow light transmission through to the active layer(s). A thin film having one or several layers of PU/PAA can said to be "transparent" when the layer or layers permit at least 50% of the ambient electromagnetic radiation in relevant wavelengths to be transmitted through the layer or layers. Similarly, layers that permit some but less than 50% transmission of ambient electromagnetic radiation in relevant wavelengths are said to be "semi-transparent."

Fire Retardation

The present nanocomposites, films and laminates display excellent fire retardation. The films produced using the methods and materials described herein display temperature resistance in excess of 300° C. The coatings can be used on fabric, furniture fillers, garments, linings, plastics, natural fibers, ceramics, automotive, marine and aviation components, space equipment, furniture coatings, etc Electronic Protective Films The present films can be used to impart a protective role to various internal electronic components such as circuit boards, advanced sensing devices and the like. The present films and nanocomposites can be used to provide a barrier function against oxygen and water.

Protective and Anti-Scratching Films

The present films and nanocomposites can be used to protect delicate surfaces from scratches and other abrasion. In one embodiment, the thin films including PU/PAA$_{1-50}$ can be used to coat eyeglasses, lenses, and other optically sensitive equipment.

Separation Membranes

Utilization of the prepared membranes as ultrathin high performance gas/ion/liquid separation membranes. Excellent mechanical properties allow for reduction of the thickness while the control of the structure affords optimization of selectivity of permeating substances. Chemical separation of various chemical entities can incorporate the membranes and films of the present technology for a multitude of applications (including gas separation, electrolyte separation, desalination, evaporation).

Cell Culture Devices

The transparent stiff films can be used as ultrathin bottoms for cell culture flasks and other tissue culture and microscope imaging chambers. These bottoms need to be very thin to cater to the optical parameters of confocal laser-scanning microscopy. Currently manufacturers of culture vessels and containers that can be used for direct microscopic viewing use very thin glass as the cell substrate/vessel bottom, which is brittle and expensive. Conventional plastic or glass Petri dishes and chambers limit the use of the inverted microscope for many applications because the thick plastic or glass bottom requires a long working distance objective available only in lower magnifications. Moreover, plastic dishes cannot be used for DIC or any polarization microscopes due to their inherent birefringence. The transparent stiff films of the present technology when incorporated as bottoms into cell culture dishes eliminate these problems, making them ideal for applications such as: patch clamp recordings where fluorescent-tagged (GFP) receptors can be identified for selective study; and many other fluorescent microscopy applications, including confocal laser-scanning microscopy which requires low background scattering of light and reduce intrinsic "auto" fluorescence that occurs when using standard plastic dishes. The thin film material described in the present technology is thin, stiff and biocompatible.

Additional Applications

In some embodiments the described films, nanocomposites and laminates of the present technology can be utilized in any application requiring a stiff membrane film highly ductile and capable of withstanding stress and shear.

The films and materials described herein can be manufactured using careful selection of polyelectrolyte coating materials. These materials can be selected with various properties and functionalities in mind. Specifically, the thin films are robust, can be sterilized and can be composed of biocompatible materials making these hardened films ideal for microelectromechanical devices, microfluidics devices, biosensors, actuators, valves, implantable biomedical devices (including bone prosthesis, implantable sensors, tissue supports, organ replicas) and the like. Moreover, biologically active molecules can be added to the coating steps to provide biologically functionalized substrates that can be used to further test physiological processes of animal cells and render the substrates conducive for tissue growth, for example in bioengineered tissues. Some of the biologically active molecules can include, growth factors, enzymes, proteins and polypeptides, nucleic acids lectins, extracellular matrix materials, ion-channels, hormones, antibodies, synthetic mimetics of all of the above, pharmaceuticals, drugs, and the like, bacteria and bacterial components, animal, plant and yeast cellular membranes, and embedded cells.

EXAMPLES

Example 1

Free-Standing Hierarchical Films Comprising Organic-Inorganic Polymers and Materials Ultrastrong and stiff layered polymer nanocomposites and hierarchical laminate materials can be produced in a traditional LBL process of sequentially coating a substrate surface with nanometer thick layers of poly(vinyl alcohol) (PVA) and Montmorillonite clay (MTM) platelets by immersing a glass substrate in dilute solutions of the components. Due to the cyclic nature of the deposition process, the film produced in n deposition cycles is hereinafter referred to as (PVA/MTM)n. One dipping sequence, (PVA)1, resulted in the addition of a polyelectrolyte-PVA layer combination with an average thickness of 1-3+0.5 nanometers. After 200 dipping sequences in both PVA/MTM solutions (PVA/MTM)200 ellipsometry and UV-Vis spectroscopy (FIGS. 5A-5D) revealed linear and uniform growth. Characterization of the assembly using atomic force microscopy (AFM) (FIG. 5B) and scanning electron microscopy (FIGS. 6A-6D) verified dense coverage of the nanoplatelets and their strictly planar orientation. The electron microscopy characterization provided thickness measurements of 1.0 µm+/−0.1 µm (SEM) and 1.5 µm+/−0.1 µm (SEM) for 200- and 300-bilayer films respectively, indicating an average of ~5 nm thickness per bilayer (FIG. 6A). Nearly identical thickness was obtained from ellipsometry for a 300-bilayer film grown on a silicon wafer: 1.480 µm+/−0.004 µm (SEM). The cross-section also revealed a well-defined layered architecture.

In some embodiments, although the PVA is uncharged unlike many other polymeric materials used in LBL, it can produce a stronger composite than other polymers that undergo electrostatic attraction to the clay sheets. Although not bound by any particular theory, it is believed that the PVA-MTM pair has two unique properties. The first is the high efficiency of hydrogen bonding. Atomic modeling revealed that the geometry of SiO4 tetrahedrons on the surface of the aluminosilicates is conducive to cooperative H-bonding (Velcro effect). The distance between the oxygen atoms of clay and hydrogen atoms of PVA are 2.75 and 2.65 Å, respectively, which makes H-bonding epitaxial. Secondly, a significant part of the efficient load transfer between the polymer and the inorganic building block is attributed to the cyclic cross-linking to Al substitution present on the surface of MTM sheets and to Al atoms located along the edges of the MTM platelets. These Al atoms are easily accessible (FIG. 7A) to the macromolecules, unlike similar groups in the middle of the sheets. An atom of Al, two atoms of oxygen and three atoms of carbon from PVA participating in this bond form a 6-member ring structure, which is known to be particularly stable (FIG. 7A).

Experimental data from Fourier transform infrared spectroscopy (FTIR), nuclear magnetic resonance (NMR), and x-ray photoelectron scattering spectroscopy (XPS), point to the formation of the Al-PVA covalent linkages. As such, a characteristic shift in the XPS spectra of Al from 74.4 to 74.9 eV can be observed (FIG. 7B); concomitantly, the change in ratio of carbon XPS peaks at 284.8 eV (—C—H$_2$) and 286.2 eV (—C—O—H) was observed (FIG. 7C). The formation of Al-PVA bonds can be further confirmed by the appearance of the characteristic FTIR vibration of Al—O—C (FIG. 7D, inset) at 848 cm$^{-1}$ and strong suppression of the C—O—H band at 3290 cm$^{-1}$ (FIG. 7E) which correlate nicely with condensation of hydroxyls at Al sites with those from PVA groups. The NMR spectra of $^{27}$Al remain the same as expected, since the coordination environment of Al (i.e. octahedral) did not change. The nanometer scale organization and the layered structure of the composite provide the necessary conditions for formation of multiples of such cyclic linkages.

Crosslinking

To further increase the strength, flexibility and utility of the various laminated structures comprising layered bilayers of PVA/MTM, films were treated with glutaraldehyde (GA) after LBL assembly to further the bonding and load transfer between the —OH groups and clay surface. GA is a highly efficient cross-linking agent for PVA and other organic polymers that form covalent acetal bridges between —OH groups of the polymer chains as well as the hydroxyl groups present on the MTM sheets and particularly on their edges. Solid-state NMR analyses reveals dramatic changes in the spectra before and after GA treatment. There is also clear evidence of reaction between GA and clay from NMR and FTIR analysis, which means that this type of cross-linking further increases connectivity between PVA/MTM bilayers as well as the clay particles themselves.

Cross-linked free-standing films showed high uniformity, strength, flexibility, and remarkable transparency (FIG. 5D). UV-Vis spectra of the 300-PVA/MTM bilayer free-standing films shows transparencies ranging from about 80% to about 90% across the visible light spectrum while pure PVA showed 90-95% transparency. In some embodiments, 300-PVA/MTM bilayer free-standing films can be formed in approximately 70wt. % (approximately 50 vol. %.) solutions of MTM. The nano-scale dimensions of the inorganic phase, the nearly perfect orientation and fine dispersion of the nanoplatelets provides such optical clarity. UV-Vis spectroscopy also showed Fabry-Perot pattern which are a further indication of high uniformity of the film.

Mechanical Properties of the PVA/MTM Films

Evaluation of mechanical properties by microtensile tests provide remarkable results even without GA cross-linking the PVA/MTM films. (Table 1 & FIGS. 8A & 8B). The PVA/MTM nanocomposite displayed approximately four times higher strength and nearly an order of magnitude higher modulus when compared to pure PVA polymer. GA crosslinking increased the strength, stiffness, and brittleness, of both pure PVA and the PVA-MTM composite (FIGS. 8A and 8B).

TABLE 1

Summary of mechanical properties for PVA and its nanocomposites.

| Sample Type (N) | Tensile Strength, $\sigma_{UTS}$ (MPa) | Modulus, E' (GPa) | Ultimate Strain, $\epsilon$ (%) |
|---|---|---|---|
| PVA (5) | 40 ± 4 | 1.7 ± 0.2 | 35 ± 4 |
| PVA with GA (5) | 40 ± 10 | 2.0 ± 0.5 | 3.3 ± 1.3 |
| PDDA (5) | 12 ± 4 | 0.2 ± 0.03 | 48 ± 9 |
| PDDA-MTM (*) | 100 ± 10 | 11 ± 2 | 10 ± 2 |
| PVA-MTM (5) | 150 ± 40 | 13 ± 2 | 0.7 ± 0.2 |
| PVA-MTM with GA (5) | 400 ± 40 | 106 ± 11 | 0.33 ± 0.04 |

The data are mean +/− SD. The tensile strengths reported were obtained using both: a commercially available servohydraulic test system and a custom in-house built tensiometer. The moduli were obtained using the custom-built tensiometer.
*Data for the PDDA-MTM are the previously published results by Tang et al. (Nat. Mater. (2003), 2(6): 413) for 1.2-4.9 μm (50-200 bilayers) thick samples tested at relative humidity of 32%.
N indicates the minimum number of the experimental data points used in the statistical calculations.

The ultimate tensile strength of the films of the present technology can be increased by nearly a factor of three over the uncross linked films, including for example, PVA-MTM strengths and ten times in comparison to that of pure PVA, to values as high as 480 MPa using the methods described above. The modulus of the PVA-MTM films cross-linked with GA can exceed that of uncross-linked PVA-MTM by one order of magnitude and can exceed the modulus of pure PVA by two orders of magnitude with a modulus ranging up to 125 GPa. For comparison, the modulus of PVA-MTM cross-linked with GA is comparable to that of various grades of Kevlar, i.e. E~80-220 GPa, and can exceed the stiffness of the strongest CNT-based fibers. Additionally, unlike PDDA-MTM composites, the PVA-MTM films with GA cross-linking showed exceptional stability under humid conditions which is consistent with the covalent character of the chemical bonds responsible for load transfer.

Without wishing to be bound by theory, it is believed that the tensile strength and modulus achieved by the films produced can be explained by the effective stiffening of the PVA matrix (due to constrained motion of the polymer chains) due to its close proximity to and the many interactions with the MTM platelets. Evidence of this reinforcement mechanism comes from differential scanning calorimetry (DSC) analysis (FIGS. 7C-7F), which shows suppression of the thermal motion of the PVA when constrained between dispersed nanoplatelets. This effect should result in the shift in glass transition temperature (Tg) toward the higher values. However, overall suppression of motions makes the actual Tg of the polymer not very well defined for such systems as can be seen in the width of the corresponding DSC peaks. An additional consequence of such stiffening is that traditional theories of composite description using original properties of pure polymers are difficult to apply to composites with high contents of uniformly distributed inorganic phase. Mechanical property enhancement in the GA cross-linked PVA-MTM is a result of an increase in the likelihood that a polymer chain in the PVA-MTM with GA system interacts strongly with two or more clay platelets, thereby improving the particle to matrix to particle load transfer process over that in the PVA-MTM system.

Example 2

Polyurethane/Poly(Acrylic Acid) Thin Films

Materials with macroscale thicknesses, suitable for different forms of manufacturing, can be produced by LBL technique. The LBL produced films described herein exhibit novel mechanical (and other) properties, for example increased ductility, transparency, tensile strength, among others. The materials described in this example are hierarchically organized structures. Multiscale hierarchy is one of the fundamental principles in nature. Compounding different levels of organization and functional engineering from nanoscale to macroscale is taken advantage of in production of materials with exceptional strength, stiffness, hardness, and toughnes. Such materials are exemplified by seashell nacre, teeth, bones, spider silk, and squid beak, which are being studied as model systems for development of advanced, high-performance composites. The challenge in utilization of this principle and achieving similar mechanical and structural features in synthetic materials lays in difficulty of robustly traversing different length-scales and retaining the specific order at each level. Consequently, the development of a new method that can show a fairly universal route to manufacturing of hierarchically structured materials is fundamentally important and provided herein are hierarchical structures derived from LBL films made by a simple lamination process. Along with simplicity of preparation, the resulting materials display high-toughness and ductility substantially exceeding the original polymeric materials.

Following the idea of hierarchical design the films described herein have been designed at the molecular level of organization. One class of material well-known for their strength and toughness are polyurethanes (PU's), which finds broad application in construction, transportation, household appliances, packaging, electronics, and implantable biomedical devices, to name a few. PU's are not known to have been used in LBL assembly, and thus, represent a new component of the present technology's LBL technique with a variety of potential applications. As used herein, but not limited to such, PU should be water-soluble and preferably charged. The chemical structure of PU in (FIG. 9A) satisfies these exemplary requirements. Polymers of PU have high solubility in water due to tertiary ammonium group in the short side chain and high density of hydrophilic groups along the backbone of the polymer. As an exemplary charged PU's that can be synthesized, this polymer has a fairly long "soft" segment, (—CH2—CH2—CH2—CH2—O—) imparting high ductility at the molecular and nanoscale levels.

Materials, LBL Assembly, and Consolidation

Cationic polyurethane aqueous dispersion (PU, ~35 wt. %, MW≈92,000) (Hepce Chem Co., South Korea) and poly (acrylic acid) (PAA, 35 wt. %, MW=250,000, pH=2.9) were used as-received by diluting to ~3.5 wt. % and 1 wt. % solutions, respectively, in deionized water. Fluorescein isothiocyanate isomer I (FITC) and tetramethyl rhodamine isothiocyanate (TRITC) fluorescent dyes were obtained from Sigma-Aldrich. PU/PAA multilayer films were prepared by conventional dipping LBL method using Midas II programmable slide stainers (EMD Chemicals. Inc.). In a typical assembly, 100-bilayer films of PU/PAA were prepared on microscope glass slides using 30 sec dips in each of the solutions and 1 min rinses with water between each dipping. Free-standing films were isolated by etching of the glass slides with 1% hydrofluoric acid. After thorough rinsing with pure water, the films were dried in an oven set to a temperature ranging from about 80° C. to about 150 ° C. Laminated samples were prepared by hot-pressing overlaid stacks of films at 100° C. and <1 ton of pressure for at least 30 min, depending on stack thickness. Blended sample was prepared by mixing of the two components in the 9:1 wt. % ratio, dry casting, and hot-pressing using the same conditions.

Mechanical Properties Evaluation

The films were subjected to uniaxial tensile tests using a vertical tensile testing machine from Test Resources. Stress data were collected by a 25 lbf load cell and strain data were collected with a Nikon D2x camera equipped with a 300 mm macro lens. Test specimens were lightly airbrushed with black paint before being cut with an elliptical punch to a gauge length of 13 mm and a width of 2 mm to 3 mm. The displacement rate used was 80 µm/s and images of the specimen were collected every 5 seconds. The paint specks were tracked manually with the ImageJ software equipped with a MetaJ tracking macro. The X and Y coordinate data was then processed with matlab to produce strain data points every 5 seconds, according to green-lagrange for infinitesimal strain and finite strains:

$$E_{ij} = \frac{1}{2}[(\delta)]_{\alpha\beta}\frac{dx_\alpha}{da_i}\frac{dx_\beta}{da_i} - \delta_{ij}\Big)_{\text{for infinitesimal strains}}$$

$$E_1 = \frac{ds - ds_o}{ds_o}\text{ for finite strains}$$

The force measurements from the load cell were divided by the measured thickness and width of the sample to give engineering strain. Three to five samples were tested for each stack.

Film-Structure Characterization

SEM images were obtained with an FEI Nova Nanolab dual-beam FIB and scanning electron microscope operated at 15 kV beam voltage. Ellipsometry measurements were obtained using a BASE-160 Spectroscopic Ellipsometer produced by J. A. Woollam Co., Inc. The instrument was calibrated to the standard silicon wafer with a thin layer of silicon dioxide and the subsequent calculations were fitted using a Cauchy's model. Fluorescent images were obtained with Leica SP2 confocal microscope. IR spectra were obtained using a Nicolet 6700 spectrometer utilizing the grazing angle accessory (Smart SAGA) at a grazing angle of 85°. XPS was carried out using a Kratos Axis Ultra. A monochromated Al K alpha X-ray source was used to irradiate the sample using a power of 140 W (14 kV, 10 mA). Elemental analysis was performed using a Perkin-Elmer 2400 Series II combustion analyzer. AFM experiments were performed in tapping mode using NanoScope IIIa instrument from Veeco Instruments (Santa Barbara, Calif.).

Results and Discussion

LBL assembly of this PU was carried out by sequentially dipping a glass microscope slide for only 30s intervals into aqueous solutions of negatively charged poly(acrylic acid) (PAA, 1 wt. %) and ~3.5 wt. % PU (FIGS. 9A and 9B) using an automated dipping robot (see Methods Section). The pattern of the multilayer accumulation showed clear evidence of e-LBL growth: ellipsometry showed rapid exponential increase in the film thickness additional bilayers (FIG. 9C). The film was strongly hydrated, which is typical for e-LBL, and had a cotton-like appearance. The PU/PAA films opaqueness in this swollen state prevented us from performing ellipsometry studies beyond few layers. Cross-sectional scanning electron microscopy (SEM) clearly indicated successful growth of PU and PAA films with the thickness of 10±3 µm and 70±10 µm for (PU/PAA)18 and (PU/PAA)100 respectively, where (PU/PAA)n represents the film obtained after n deposition cycles. Interestingly, although strongly swelling and hydrating, the films were easily separated from the substrate and handled (FIG. 9D). The free-standing films were found to be robust and strong allowing for easy scale-up to much larger substrates and film sizes. (FIGS. 9D and 9E).

Continuing with hierarchical design of the materials and entering the micron/macro scale, we have exploited the swelling characteristic of the e-LBL films to combine together individual sheets into a hierarchical, laminated composite according to the schematic in (FIG. 10A). In this methodology, dried films are first allowed to swell in water to increase their flexibility and then they are overlaid on top of each other to achieve conformal overlap. The swollen and hydrated interfaces interdigitate between adjacent films and promote consolidation of the stack into a homogeneous structure. The stack is further dried in order to remove water, and the structure compacts. Once dried, the stack is finally compressed under mild pressure, <1 ton and at a temperature of 110° C. The applied pressure is necessary in order to provide intimate contact between individual sheets. We found that temperatures in the range of 110° C.-121° C. are optimal for successful consolidation. Below 110° C. there was no consolidation and films were easily pealed apart and above 121° C. the stacks showed signs of decomposition. Differential scanning calorimetry analyses revealed that this temperature range corresponds to a broad peak which can be attributed to the melting point of the LBL composite.

Successful consolidation resulted in a homogeneous and transparent material. SEM characterization of the individual and consolidated structures revealed that the origin of the opaque appearance in single films is due to large surface roughness. (FIGS. 10E and 10F). This roughness can be attributed to the non-uniform volume changes during drying of the swollen films as well as partial degradation of the films from shearing forces during rinsing. In comparison, the consolidated samples showed uniform and homogeneous cross-section and surface, indicating that the hot-pressing procedure removes defects originating from LBL assembly.

Unexpected results were obtained when the mechanical properties of the thin films were evaluated (FIGS. 9A-9E and Table 1 below). For example, tensile mechanical properties of the base PU gave: yield strength, σY=4.3±0.5 MPa; ultimate strength, σUTS=30±3 MPa; Young's modulus, E=55±5 MPa; and ultimate strain, ε=420±30%. The available literature data for PAA give: σUTS=~4.5-12.3 MPa and ε=~2-116%; and they correspond to the hydrated state due to the highly hydroscopic nature of the polymer. Compared to the pure PU, in-plane tensile properties of single LBL films showed 3× increase in σY to 12 MPa, no change in σUTS, and approximately four times the improvement in E at approximately 230 MPa. The ultimate strain (ε), however, showed a reduction in nearly 50%, in comparison to PU, down to only ε~250% and substantial improvement compared to PAA. This was an encouraging result, since none of the previously reported LBL films showed this level of ductility, thus establishing precedence for preparation of highly flexible multilayered films.

TABLE 1

Summary of mechanical properties for PU, PAA, single e-LBL sheet, consolidated PU/PAA e-LBL structures, and a PU-PAA blend in 9:1 proportion by weight.

| Sample Type | Yield Strength, $\sigma_Y$ (MPa) | Ultimate Tensile Strength, $\sigma_{UTS}$ (MPa) | Young's Modulus, E (MPa) | Ultimate Tensile Strain, ε (%) | Toughness, (MJ/m³) |
|---|---|---|---|---|---|
| PU | 4.3 ± 0.5 | 30 ± 3 | 55 ± 5 | 424 ± 31 | 49 ± 6 |
| PAA* | — | ~4.5 – 12.3 | — | ~2 – 116 | — |
| 1 Film | 12 ± 1 | 29 ± 8 | 228 ± 135 | 250 ± 32 | 48 ± 14 |

TABLE 1-continued

Summary of mechanical properties for PU, PAA, single e-LBL sheet, consolidated PU/PAA e-LBL structures, and a PU-PAA blend in 9:1 proportion by weight.

| Sample Type | Yield Strength, $\sigma_Y$ (MPa) | Ultimate Tensile Strength, $\sigma_{UTS}$ (MPa) | Young's Modulus, E (MPa) | Ultimate Tensile Strain, $\epsilon$ (%) | Toughness, (MJ/m³) |
|---|---|---|---|---|---|
| 1 Film Hot-Pressed | 15 ± 2 | 29 ± 7 | 126 ± 133 | 172 ± 55 | 39 ± 18 |
| 2-Film Stack | 13 ± 0.5 | 54 ± 18 | 310 ± 45 | 366 ± 74 | 105 ± 40 |
| 3-Film Stack | 13 ± 1 | 53 ± 5 | 333 ± 48 | 344 ± 46 | 92 ± 12 |
| 4-Film Stack | 14 ± 0.5 | 61 ± 13 | 343 ± 123 | 362 ± 65 | 111 ± 32 |
| 5-Film Stack | 15 ± 1 | 86 ± 4 | 237 ± 19 | 361 ± 10 | 140 ± 2 |
| 10-Film Stack | 14 ± 0.4 | 85 ± 3 | 325 ± 157 | 356 ± 10 | 132 ± 4 |
| 9:1 PU/PAA Mixture | 6.4 ± 0.3 | 39 ± 12 | 58 ± 6 | 353 ± 47 | 66 ± 23 |

*Mechanical properties for PAA are taken from Nam et al. Journal of Membrane Science 1997, 135 (2), 161-171. and Huang et al. Polymer Degradation and Stability 2007, 92 (6), 1072-1081. The disclosures of which are hereby incorporated in their entirety.

Tensile tests on consolidated samples with hierarchical organization described using the methods of the present technology showed marked improvement of the modulus (E to ~340 MPa), and dramatic improvements in both the strength ($\sigma$UTS ~85 MPa) and the strain ($\epsilon$ ~360%) over the pure PU and even single LBL film. The toughness of the composite stacks composed of 5- and 10-sheets was nearly three times greater than that of the pure PU.

Possible explanation of these results come from the different levels of the hierarchical organization: molecular, nano-, and macro-scale that are utilized in the films of the present technology. It is believed that at the molecular scale, the chemical composition of the LBL films of the present technology was found by elemental analysis and x-ray photoelectron scattering spectroscopy (XPS) to be ~90 wt. % PU and ~10 wt. % PAA. This large dominance of PU explains high ductility of the composite. Based on the molecular weights of the repeat units, the ratio of the charged groups between PU and PAA is actually 1:9, which suggests that they form a complicated electrostatic- and hydrogen-bonding network between each other in order to achieve electrostatic neutrality. The XPS analyses also revealed complete absence of sulfur (FIG. 9A) in the LBL samples, which further suggests that the cationic groups directly interact with PAA via ionic and charge-dipole bonds. These cross-links, which are predominantly formed with the hard segments of the PU (FIG. 9A) give rise to the improved mechanical properties without significantly perturbing the elastic soft domains. FTIR analysis further showed that hot-pressing of the films does not change the chemical signature of the material, i.e. by formation of new bonds from covalent cross-linking, thus further supporting the idea of ionic cross-linking reinforcement.

Characterization of a blend of the two polymers prepared by simple mixing showed slight improvement of E and $\sigma$UTS over the bare PU, and similar reduction in $\epsilon$ when compared to e-LBL material. (FIG. 11C). The $\sigma$Y and $\sigma$UTS are however significantly lower than those of the e-LBL composite. This suggests that the nanostructuring imparted by LBL deposition process significantly alters morphology and crystalline structure of the composite. Atomic force microscopy (AFM) comparison of PU, PU-PAA blend, and PU/PAA e-LBL materials showed that they have dramatically different patterns and domain connectivity (FIGS. 11E, 11F, and 11G). The nanoscale morphology in LBL films can be described as cellular network of soft and hard molecular compositions with the presence of linear domains oriented parallel to the dipping direction. The approximate size of domains in the blend is 80-300 nm while the cellular network domains in LBL films have approximate diameter of 150 nm with the elongated domains having widths of 30-50 nm and lengths as long as 5 microns and above. The difference in hardness contrast is also much greater in mixed film than in the LBL film suggesting that the multilayer is significantly more uniform. The pattern of domains in the LBL films share similarities with that of pure PU. The size of cells is substantially larger in PU and there are no linear features.

At the macro-scale, one additional mechanism plays a crucial role: elimination of defects in the lamination process. The defects in free-standing LBL films can be seen in the non-uniform thickness in (FIGS. 10E and 10F), and in apparent cavities in the cross-section (FIG. 11D). They likely originate from shearing forces during rinsing stage of the film preparation, and in the dried material they lead to premature rupture and thus decreased strain and strength of the individual film. Consolidation of the films gradually removes the defects with increasing thickness of the stack by: (a) compressing the cavities into continuous, solid material, (b) partial melting of the material and healing of the defects and, (c) cooperative sealing of the surface defects by adjacent films. This can be especially seen from the comparison of 1- to 5-film structures, in which the ultimate strain and stress gradually increase and asymptote to $\epsilon$ ~360% and $\sigma$UTS ~85 MPa. (FIG. 11C and Table 1).

Lamination and the hierarchical design of material not only impart exceptional mechanical properties but also offer opportunities for incorporation of unique properties in the resulting structures. To demonstrate this, we prepared films with addition of FITC and TRITC fluorescent dyes. (FIG. 12A). The dye-labeled films were further consolidated in different sequences and characterized using laser-scanning confocal microscopy. Alternate stacking of green- and red-fluorescent films revealed that in spite of partial surface melting the films do retain their individuality (FIG. 12B). This property can be used to manufacture multifunctional materials with a variety of applications because the films can equally well incorporate other molecules or nanomaterials by incorporation into deposition sequence.

A ~1.2 mm thick sample in which the labeled films have been separated by 3 plain films was impaled with a small steel ball and the resulting damage was imaged using the confocal microscopy (FIG. 12C). The ability of confocal microscopy to generate images at different focal lengths allows the user to generate 3D fluorescence images. Using this feature, we were able to generate 3D images of the resulting damage (FIGS. 12D and 12F). Applying this technique in this context allowed us to visualize the structural deformations at different depths of the material, which would not be possible using optical or electron microscopes (FIGS. 12F and 12G). The confocal microscopy imaging offers a noninvasive damage detection method with excellent spatial resolution (~1 μm) when compared to other widely utilized techniques. Of the different methods available, e.g. electrical conductivity, optical fiber detection, or ultrasonic evaluation, only high resolution x-ray computed tomography (CT) has capability of approaching similar resolution.

Example 3

Synthetic Nacre Replacement Materials

This present example provides methods for making and using nacre-like composite with ultimate strength ($\sigma$UTS) far greater than that of any other nacre mimics prepared until now and two to three times stronger than natural nacre. Furthermore the synthetic nacre composite materials described herein have a manifold of weaker bonds which can potentially be engaged in a similar manner as sacrificial ionic bonds.

Materials and Methods

Polyvinyl alcohol (PVA) with molecular weight of MW≈70,000 and 20 wt. % solution of poly(diallyldimethylammonium chloride) (PDDA), MW≈100,000-200,000 were purchased from Sigma-Aldrich (St. Louis, Mo.) and used as received. Na+-Montmorillonite ("Cloisite Na+", MTM) powder was purchased from Southern Clay Products (Gonzales, Tex.). The average size of the platelets is 110 nm as described by the manufacturer. From dynamic light scattering we can state that the degree of exfoliation is virtually 100% in aqueous dispersions. $FeCl_3$, $CaCl_2$, $AlCl_3$, and $CuCl_2$ salts were obtained from Sigma-Aldrich. 25 mm×75 mm microscope glass slides used for the nanocomposites preparation were obtained from Fisher Scientific. Hydrogen peroxide and concentrated sulfuric acid used in the piranha cleaning solution were both purchased from Sigma-Aldrich. Concentrated hydrofluoric acid (HF) was obtained from Sigma-Aldrich and a 1 vol. % HF solution used for preparation of free-standing films was prepared by appropriately diluting the stock solution with DI water. Isopropanol, A.C.S. grade, used in separation of free-standing films was purchased from Sigma-Aldrich. 0.5 wt % dispersion of MTM, used in the experiments, was prepared by dissolving 5 g of clay in 1 L of 18 MΩ*cm-1, pH=5.6 de-ionized water (DI water), under vigorous stirring for 1 week prior to use. After 1 week, insoluble fraction was allowed to sediment and supernatant was collected. 1 wt. % PVA solution used for LBL assembly was prepared by dissolving 10 g of PVA powder in 1 L of 80° C. DI water under vigorous stirring. 0.5 M ionic solutions were prepared by dissolving appropriate amounts of salts in DI water. 0.5 wt. % solution of PDDA was prepared by diluting the stock solution with DI water.

Preparation of PVA/MTM Thin Films

Prior to beginning deposition of the PVA-MTM films, the slides were cleaned by immersion into "piranha" solution (3:1 $H_2SO_4$:$H_2O_2$, dangerous if contacted with organics) for 1 hour, followed by thorough rinsing with DI water. In a typical sample preparation, a clean glass slide was immersed in 1 wt. % solution of PVA, for 5 minutes, rinsed with DI water twice for 1 minute and gently dried with compressed air for 1 minute, then immersed in 0.5 wt. % MTM dispersion for 5 minutes, rinsed twice for 1 minute, and again dried with compressed air for 1 minute. This procedure gave a single deposition cycle and reversal of the surface charge to the original (negative). The cycle could then be repeated as necessary to obtain the desired number of layers. Preparation of the samples was accomplished using a StratoSequence IV, a robotic dipping machine, from nanoStrata Inc. (Tallahassee, Fla.). After buildup the glass slides were immersed into the salt solutions for 24 hours at room temperature. In the case of Cu2+ the slide was kept in the solution for 3 days.

After cross-linking, free-standing films of the composites were isolated with 1 vol. % HF solution. The detached, free-standing films were further dried in a drying oven at 60° C. and then set aside to equilibrate in ambient conditions (approximately, 18° C.-24° C. temperature and ~20-30% relative humidity) for at least 24 hours prior to mechanical testing. Films of pure PVA and pure PDDA were prepared by evaporating approximately 65 mL of the 1 wt. % and 0.5 wt. % solutions of each of the polymers in a 100 mm diameter×10 mm deep Petri dish in a drying oven at 80° C. for 48 h. PDDA films, due to hydrophilic nature were kept dry in the oven until testing.

Instrumental Analysis

LBL process was monitored using an 8453 UV-vis Chem Station spectrophotometer produced by Agilent Technologies. The reference spectrum for the instrument was ambient air and collected spectra of the adsorbed material were compared to UV-vis absorbance of a fresh, piranha-cleaned glass slide. Atomic Force Microscopy (AFM) images were obtained using a NanoScope IIIa atomic force microscope (AFM) from Veeco Instruments (Santa Barbara, Calif.). The instrument was operated in tapping mode with silicon nitride cantilever tips (NSC16/Cr—Au, MikroMasch) at a scan rate of 1 Hz. Ellipsometry measurements were obtained using a BASE-160 Spectroscopic Ellipsometer produced by J. A. Woollam Co., Inc.

The instrument was calibrated to the standard silicon wafer with a thin layer of silicon dioxide and the subsequent calculations were fitted using a Cauchy's model. The samples used for ellipsometry were prepared on silicon wafers following the same LBL protocol described previously. Loading of MTM inside of the free-standing film was determined with thermo-gravimetric analyzer (TGA) Pyris 1 from PerkinElmer, with temperature ramp-up rate of 10° C./min while being purged with air at a flow rate of 20 ml/min. The sample size was chosen between 0.1 and 0.5 mg for all of the samples tested. Scanning electron microscopy (SEM) images were obtained with an FEI Nova Nanolab dual-beam FIB and scanning electron microscope. Due to nonconductive nature of the specimens, a few nm thick layer of gold was sputtered onto the surface of the film prior to imaging. The instrument was operated at 15 kV.

Mechanical Testing of PVA-MTM films

The tensile mechanical properties were analyzed by two instruments: 1) Stress-strain curves were obtained by testing ~1 mm wide and 4-6 mm long rectangular strips of the materials with a mechanical strength tester 100Q from TestResources Inc. (Shakopee, Minn.). Tests were performed at a rate of 0.01 mm/s with a ~4.9 N range load cell. The number of tested samples was normally 10-15 for the LBL nanocomposites and 4-5 for the pure polymers. The Young's modulus E could not be accurately analyzed with this instrument due to substantial mechanical compliance issues which resulted in inaccurate strain measurements.

The same films (same geometry and batches) were tested in parallel in tension using an in-house designed tensiometer. The tensiometer was built around a Nikon SMZ 800 dissecting microscope that was fitted with a Basler A102fc digital video camera. Dual actuators were driven by MicroMo stepper motors and mounted on Del-Tron crossed roller slides that enabled the specimen to stay in the center of view. Grips were machined out of stainless steel and placed at the end of both actuators. The specimen ends were adhered to the grips via adhesive tape. The axial servomotors were controlled using LABVIEW software on a Dell Precision 300 computer which also synchronized data acquisition from the load element with image acquisition from the digital camera. The samples were loaded at a constant true strain rate of 0.005/sec until failure and the synchronized force and image recordings were compiled using LABVIEW.

Analysis of actual material strain was achieved by electrostatically adhering 25 μm diameter glass beads on the specimen surface. The specimen images were analyzed with LABVIEW software to track the glass bead positions. The raw load vs. image data was converted to nominal stress (load/CSA) vs. nominal strain data (change in separation of glass beads/initial separation). The Young's modulus was determined by calculating the initial slope of the nominal stress vs. nominal strain data. At least 5 samples were tested in order to produce each data point for the stress-strain curves.

Most of the attributes of the above tensile tests confirm to the ASTM standard ASTM D 882. The standard includes the testing of plastic sheets with the thickness not greater than 0.25 mm The PVA and PVA-MTM samples tested here are within this limit. The standard calls for the measurement of specimen extension by grip extension or displacement of gage marks. Here, the gage marks are the 25 μm diameter glass beads on the specimen surface. All of the tests were performed under similar environmental conditions with relative humidity maintained in the range of ~20 -30% and ambient temperature in the range of 18-24° C.

Results and Discussion

As a start we used LBL films made from PVA and MTM which are bound mainly through a manifold of weak hydrogen bonds. Ionic bonds were introduced after assembly by cross-linking PVA with metal cations Mn+. Atomic force microscopy (AFM) revealed full platelet coverage of the surface resembling that in nacre (FIG. 13E). Growth profile of the films characterized with UV-vis spectroscopy and ellipsometry (FIG. 13B and S1) revealed fairly linear growth. Ellipsometry measurements gave a thickness of ~3.5 nm per bilayer for the first 10 deposition cycles. 200 and 300 bilayer films were prepared using an automated dipping machine (nanoStrata Inc., Tallahassee, Fla.). Once completed, films were cross-linked with 0.5 M solutions of Mn+, i.e. FeCl3, CaCl2, AlCl3, or CuCl2 for 24 h. Free-standing samples were separated from the slides using a HF etching method described previously and dried at 80° C. for 10 min. Note that unlike nacre, the ionic bonds in the case of Mn+ cross-linking are intramolecular with respect to PVA chains rather than between the polymer and inorganic plates.

The resulting films were found to be strong, flexible, but also highly transparent, which is attributed to the nanoscale dimensions of the inorganic phase (FIGS. 13C and 13D) and high orientation of MTM. Light transmittance measurements showed between 50-90% of transparency across the visible spectrum of light for the composites while for plain PVA films it was found to be 90-95% (FIG. 14). These results are quite interesting considering that these films are composed of ~50 vol. % (~70 wt. %) clay as was established by thermo-gravimetric analysis (FIG. 15). Additionally, the transmittance spectra showed Fabry-Perot fringes which are indicative of high uniformity of the films. SEM revealed a high degree of MTM ordering into a well-defined lamellar structure (FIG. 13F). The thickness of the 200- and 300-bilayer films was found from SEM to be 1.0 μm±0.1 μm and 1.5 μm±0.1 μm, respectively, which gives ~5 nm per bilayer when averaged over the entire thickness of the composite. High transparency of the film also allowed for verification of the thickness with ellipsometry; for the 300-bilayer sample the thickness was nearly identical to that found via SEM: 1.48 μm±0.004 μm.

Although no ionic bonds were involved in PVA/MTM bonding, the non-cross-linked films actually showed 50% higher strength then PDDA/MTM samples studied previously (Table 1).

TABLE 1

Compilation of mechanical properties for PDDA/MTM and PVA-based composites.

| | Ultimate Tensile Strength, $\sigma_{UTS}$ (MPa) | Modulus, E' (GPa) | Ultimate Strain, ε (%) |
|---|---|---|---|
| Pure PDDA[a] | 12 ± 4 | 0.2 ± 0.03 | 48 ± 9 |
| Pure PVA[a] | 40 ± 4 | 1.7 ± 0.2 | 35 ± 4 |
| PDDA/MTM | 100 ± 10 | 11 ± 2 | 10 ± 1 |
| PVA/MTM Film | 150 ± 40 | 13 ± 2 | 0.7 ± 0.2 |
| PVA/MTM + $Al^{3+}$ | 250 ± 50 | 41 ± 5 | 0.33 ± 0.15 |
| PVA/MTM + $Cu^{2+}$ | 320 ± 40 | 58 ± 6 | 0.28 ± 0.02 |

We believe that this increase is due to an abundance of hydrogen and van-der-Waals bonds that can break and reform when the polymer and clay phases slide against each other similarly to ionic bonds in nacre. They also demonstrated relatively high strains. (FIG. 16). The presence of break-reform mechanism in PVA/MTM can also be seen in differential strain curve (FIG. 16) with a characteristic saw-tooth pattern typical for nacre proteins. Implementation of Mn+ cross-linking showed dramatic increases in tensile strength and stiffness: σUTS, ~150 MPa→~320 MPa and E', ~13 GPa→~60 GPa (arrow indicates change after ionic cross-linking). This is especially evident for Cu2+ and Al3+ treated samples. Ca2+ and Fe3+, while being good cross-linking agents for PVA, did not show any improvement at all, which may be attributed to partial bonding of OH groups with clay. The tensile strength of Cu2+ cross-linked film is more than twice as high as that of nacre (σUTS≈80-135 MPa), which represents a substantial improvement, and three times greater then PDDA/MTM composite. Similarly the stiffness of the Cu2+ cross-linked film approaches that of nacre (E≈60-70 GPa) and it exceeds that of the PDDA/MTM composite by five times. Strain, however, remains similar to that seen in the PVA/MTM composites cross-linked by GA. It is also somewhat lower than that of nacre (0.8%), which remains the next materials design challenge but can also be potentially improved upon using appropriate polymers.

Conclusions

The present methods demonstrate the preparation of a thin film of nacre-like clay nanocomposite which utilizes cross-links from both ionic and other weaker bonds. These cross-links are likely to break and form again in the course of the deformation, which can explain several experimental observations. Nevertheless, we need to be cautious and point out that the exact mechanism of the stretching of PVA molecules sandwiched between the parallel sheets on clay is will require special study probably by spectroscopic means. Overall, we obtained material which has superior properties to the original prototype found in nature. This underscores the importance of molecular engineering of the composites and the necessity of the high degree of control over their nanoscale organization.

While the present technology have been illustrated and exemplified throughout the description and in the Examples, it is obvious to one of ordinary skill that many changes may be made in the details of the process of assembly without departing from the spirit and scope of this disclosure.

What is claimed is:

1. A layered polymer nanocomposite comprising:
a nanosheet laminate having a first layer and a second layer, said first layer being made of a first material comprising poly(vinyl alcohol) (PVA) and said second layer being made of a second material comprising an aluminosilicate nanoparticle, wherein said first material and said second material have a chemical affinity for each other, wherein the first layer comprising PVA is cross-linked by exposure to a cross-linking agent selected from the group consisting of: manganese ions ($Mn^+$) and copper ions ($Cu^{2+}$) to form an ultrastrong nanosheet laminate.

2. The layered polymer nanocomposite according to claim 1, wherein the aluminosilicate nanoparticle is selected from the group consisting of vermiculite, bentonite, montmorillonite, Na-montmorillonite, Ca-montmorillonite, hydrated sodium calcium aluminum magnesium silicate hydroxide, pyrophyllite, magnesium aluminum silicates, lithium aluminum silicates, zirconium silicates, andalusite, kyanite, hectorite, sillimanite, zeolites, colloidal clays, colloidal kaolin, attapulgite, and combinations thereof.

3. The layered polymer nanocomposite according to claim 1, wherein the aluminosilicate nanoparticle of the second material comprises montmorillonite.

4. The layered polymer nanocomposite according to claim 3, wherein the nanocomposite has an ultimate tensile strength ($\sigma_{UTS}$) of at least 150±40 MPa.

5. The layered polymer nanocomposite according to claim 3, wherein the nanocomposite has a Young's modulus (E') of at least 13±2 GPa.

6. The layered polymer nanocomposite according to claim 1, wherein the first layer comprising PVA is cross-linked by exposure to copper ions ($Cu^{2+}$) so as to form the ultrastrong nanosheet laminate having an ultimate tensile strength ($\sigma_{UTS}$) of at least 320±40 MPa and a Young's modulus (E') of at least 58±6 GPa.

7. The layered polymer nanocomposite according to claim 1, wherein the first layer comprising PVA is cross-linked by exposure to manganese ions ($Mn^+$) so as to form the ultrastrong nanosheet laminate having an ultimate tensile strength ($\sigma_{UTS}$) of at least 320 MPa and a Young's modulus (E') of at least 60 GPa.

8. A structural laminate comprising:
a plurality of lamina, wherein each said lamina of the plurality comprises an adhesive polymer selected from the group consisting of: polyurethanes, poly(vinyl alcohol), epoxy resins, silicones, latexes, polyamides, and polyimides, that is reinforced with a fiber; and
a polymer nanocomposite film disposed between the lamina of said plurality, wherein the polymer nanocomposite film comprises a curable polymer and a nanoparticle selected from the group consisting of: a single walled carbon nanotube, a multiwalled carbon nanotube, silica, iron oxide, alumina, aluminosilicates, thoria, titania, zirconia, and combinations thereof, wherein respective lamina are alternatingly arranged between the polymer nanocomposite film, wherein said lamina and said polymer nanocomposite film are co-cured to form an ultrastrong structural laminate.

9. The structural laminate according to claim 8, wherein the fiber is selected from the group consisting of carbon fiber, metal fibers, carbon nanotubes, glass fiber, and combinations thereof.

10. The structural laminate according to claim 8, wherein the polymer nanocomposite film comprises a polymer selected from the group consisting of: polyamide, bismaleimide, and polyurethane.

11. The structural laminate according to claim 8, wherein each of said lamina of said plurality has fibers that are oriented and the adhesive polymer is cured to form the structural laminate.

12. The structural laminate according to claim 8, wherein the fiber is selected from the group consisting of carbon fiber, glass fiber, and combinations thereof, and has a diameter of 4 micrometers to 12 micrometers.

13. A method for making a hierarchical laminated composite, said method comprising:
coating a substrate with a compatible first material and alternating the coating of the first material with a coating of a second material, wherein the first material and the second material have a chemical affinity; thereby forming a thin film disposed on the substrate;
removing the thin film from the substrate;
drying the thin film;
hydrating the thin film in a liquid for at least about an hour to allow the thin film to swell;
stacking a plurality of hydrated thin films to achieve conformal overlap thereby forming a stack of thin films, wherein the hydrated thin films interdigitate with adjacent hydrated thin films in the stack; and
consolidating the stack of thin films to form the hierarchical laminated composite.

14. The method for making a hierarchical laminated composite according to claim 13, wherein the first material is a polymer selected from the group consisting of poly(vinyl alcohol), poly(acrylic acid), poly(ethyleneimine), polyurethane, bismaleimide, polyimide, polyamide, and combinations thereof.

15. The method for making a hierarchical laminated composite according to claim 13, wherein the second material is selected from the group consisting of a nanoparticle, a conductive compound, a polymer, and combinations thereof.

16. The method for making a hierarchical laminated composite according to claim 13, wherein the consolidating step comprises:
drying the stack of thin films under vacuum;
pressing the dried stack of thin films at an elevated temperature and pressure thereby forming a consolidated laminate composite; and
removing the consolidated laminate composite from the press.

17. The method for making a hierarchical laminated composite according to claim 16, wherein drying the stack of thin films comprises heating the stack of thin films to a temperature ranging from about 80° C. to about 150° C.

18. The method for making a hierarchical laminated composite according to claim 16, wherein pressing the dried stack of thin films comprises compressing the stack of thin films at 100° C. at a pressure of less than 1 ton for at least 30 min.

19. The method for making a hierarchical laminated composite according to claim 13, further comprising cross-linking said thin film.

20. The method for making a hierarchical laminated composite according to claim 19, wherein the cross-linking occurs by exposing said thin film to glutaraldehyde.

21. The method for making a hierarchical laminated composite according to claim 13, wherein consolidating the stack of thin films to form the hierarchical laminated composite occurs at a temperature in a range of 110° C. to 121° C.

22. The method for making a hierarchical laminated composite according to claim 13, wherein the first material comprises poly(acrylic acid) and the second material comprises polyurethane.

* * * * *